(12) United States Patent
James et al.

(10) Patent No.: US 10,794,529 B2
(45) Date of Patent: Oct. 6, 2020

(54) GAS CYLINDER QUICK RELEASE DEVICE

(71) Applicant: B&Z Productions, LLC, Phoenix, AZ (US)

(72) Inventors: Barbara J. James, Phoenix, AZ (US); Michael S. Saperton, Phoenix, AZ (US)

(73) Assignee: B&Z Productions, LLC, Phoenix, AZ (US)

( * ) Notice: Subject to any disclaimer, the term of this patent is extended or adjusted under 35 U.S.C. 154(b) by 0 days.

(21) Appl. No.: 16/378,755

(22) Filed: Apr. 9, 2019

(65) Prior Publication Data

US 2019/0249819 A1 Aug. 15, 2019

Related U.S. Application Data

(62) Division of application No. 15/615,334, filed on Jun. 6, 2017, now Pat. No. 10,260,671.

(Continued)

(51) Int. Cl.
*F16M 11/04* (2006.01)
*A47B 3/06* (2006.01)
(Continued)

(52) U.S. Cl.
CPC .............. *F16M 11/041* (2013.01); *A47B 3/06* (2013.01); *A47B 13/021* (2013.01); *A47C 3/30* (2013.01); *A47C 7/004* (2013.01); *F16M 11/08* (2013.01); *F16M 11/16* (2013.01); *F16M 11/42* (2013.01); *A47B 9/10* (2013.01); *A47B 2013/022* (2013.01); *A47B 2200/0076* (2013.01); *F16M 11/04* (2013.01); *F16M 2200/02* (2013.01); *F16M 2200/08* (2013.01)

(58) Field of Classification Search
CPC ...... F16M 11/041; F16M 11/08; F16M 11/42; F16M 11/04; A47B 3/06; A47B 9/10; A47B 2013/022; A47B 2200/0076; A47C 3/30; A47C 7/004
See application file for complete search history.

(56) References Cited

U.S. PATENT DOCUMENTS

| | | |
|---|---|---|
| 3,790,119 A | 2/1974 | Bauer |
| 4,283,033 A | 8/1981 | Bauer |

(Continued)

FOREIGN PATENT DOCUMENTS

| | | |
|---|---|---|
| CN | 2412830 | 1/2001 |
| CN | 101549735 A | 10/2009 |

(Continued)

*Primary Examiner* — Anita M King
(74) *Attorney, Agent, or Firm* — Thomas W. Galvani, P.C.; Thomas W. Galvani

(57) ABSTRACT

A gas cylinder quick release device has an upper bearing plate, and a lower annular collar arranged below the upper bearing plate on an axis common to the upper bearing plate and the lower annular collar. A handle is mounted to move between a first position and a second position. Movement of the handle from the first position to the second position imparts axial displacement of the upper bearing plate and the lower annular collar away from each other along the axis. The lower annular collar moves downward along the axis when the lower annular collar is axially displaced away from the upper bearing plate.

19 Claims, 19 Drawing Sheets

Related U.S. Application Data

(60) Provisional application No. 62/471,951, filed on Mar. 15, 2017, provisional application No. 62/346,433, filed on Jun. 6, 2016.

(51) Int. Cl.
| | |
|---|---|
| *A47B 13/02* | (2006.01) |
| *A47C 3/30* | (2006.01) |
| *A47C 7/00* | (2006.01) |
| *F16M 11/16* | (2006.01) |
| *F16M 11/08* | (2006.01) |
| *F16M 11/42* | (2006.01) |
| *A47B 9/10* | (2006.01) |

(56) References Cited

U.S. PATENT DOCUMENTS

| | | |
|---|---|---|
| 5,476,020 A | 12/1995 | Garvey et al. |
| 6,004,064 A | 12/1999 | Franz |
| 6,941,621 B1 | 9/2005 | Wolforth et al. |
| 10,260,671 B2 * | 4/2019 | James .................... F16M 11/08 |
| 2003/0151291 A1 | 8/2003 | Lin et al. |
| 2006/0214489 A1 | 9/2006 | Cheng |
| 2014/0271036 A1 | 9/2014 | Emmerich |

FOREIGN PATENT DOCUMENTS

| | | |
|---|---|---|
| GB | 2120088 A | 11/1983 |
| JP | H1037570 A | 2/1998 |

* cited by examiner

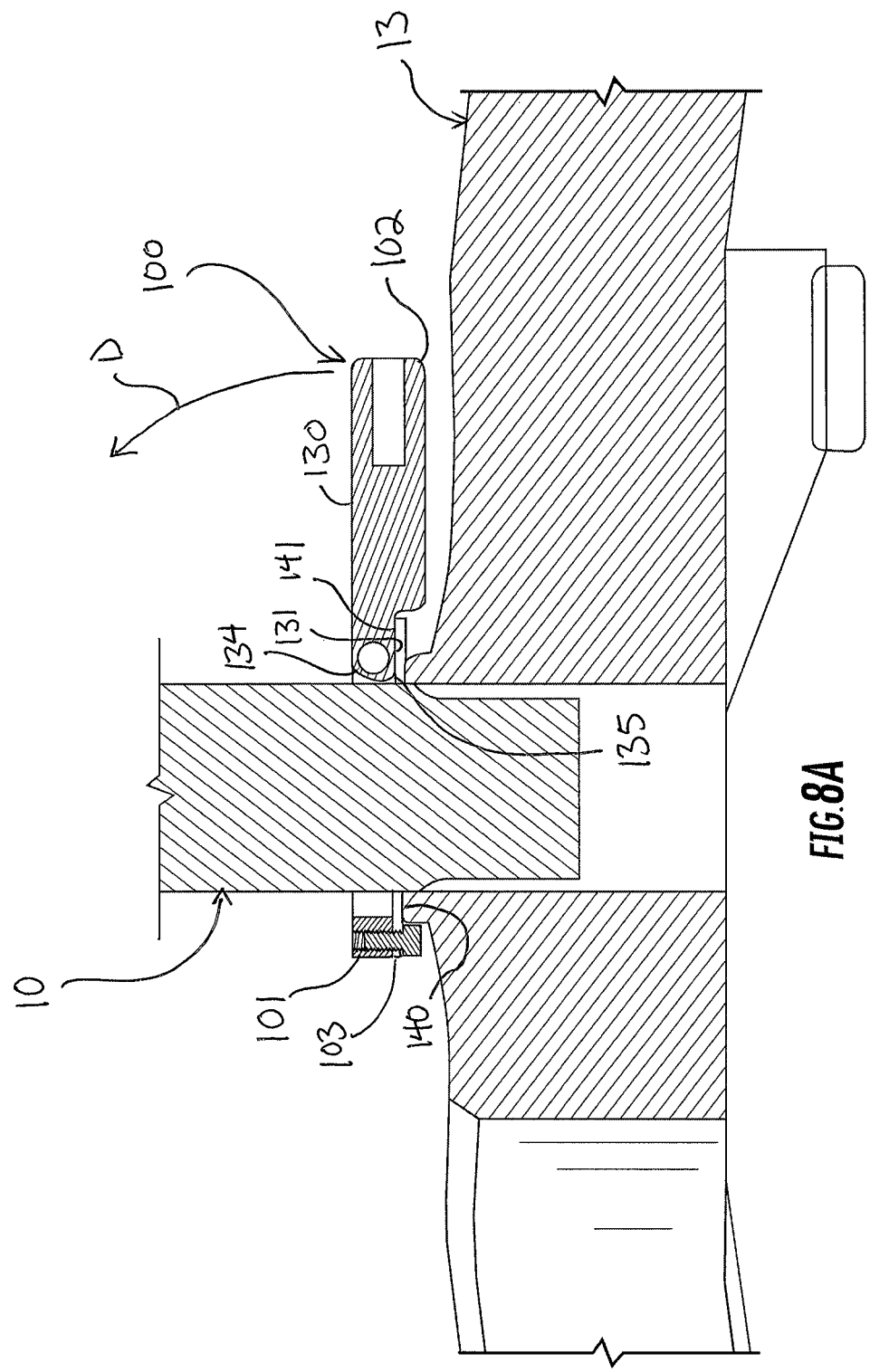

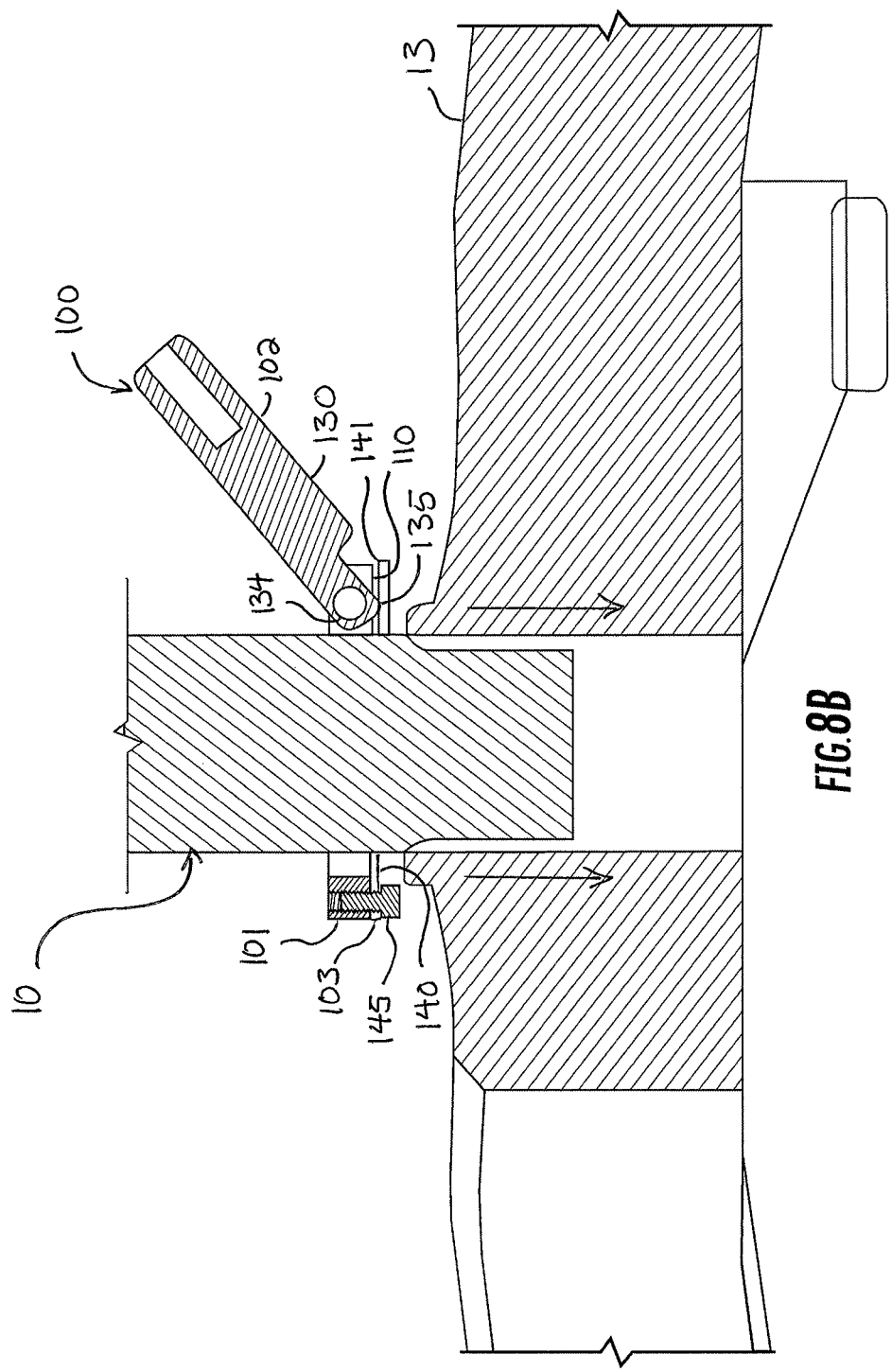

GAS CYLINDER QUICK RELEASE DEVICE

CROSS-REFERENCE TO RELATED APPLICATIONS

This application is a division of U.S. patent application Ser. No. 15/615,334, filed Jun. 6, 2017, which claimed the benefit of U.S. Provisional Application No. 62/471,951, filed Mar. 15, 2017, and of U.S. Provisional Application No. 62/346,433, filed Jun. 6, 2016, all of which are hereby incorporated by reference.

FIELD OF THE INVENTION

The present invention relates generally to office furniture, and more particularly to devices for disassembling office furniture quickly and easily.

BACKGROUND OF THE INVENTION

In the exhibitor and conference industry, office furniture is repeatedly transported in trucks, unpacked, set up, used, and then packed back into the trucks for transportation to a warehouse or other storage facility. Some pieces of furniture—conference tables, media screens, speakers, are fairly easy to pack; they can be laid flat, rolled up, or packed into road cases and then placed into the truck. Items such as these may be densely packed because they are either small or large but heavy.

Some types of furniture, such as office chairs and table tops, present packing issues, however. Table tops generally have to be completely dismantled. And even though office chairs are relatively light, they are quite large and cumbersome. They cannot be laid flat, rolled up, or packed into a box. Indeed, they cannot even be disassembled: almost all office chairs have a seat back and a seat bottom mounted on a seat plate. The seat plate connects to a gas lift or non gas-lift cylinder that is mounted in a wheelbase. The seat back and seat bottoms are typically fastened to each other, either directly or indirectly through the arm rests, with many fasteners that are laborious to remove but easy to lose once removed. The seat bottom is bolted to the seat plate. The cylinder is press fit into and between the seat plate and the wheelbase. This press fit is nearly impossible to undo without destroying, or at least damaging, the rest of the chair.

Gas cylinders typically have an external sleeve and a rod which reciprocates in the sleeve. The rod is usually directed upward while the sleeve is downward, such that the rod is press fit into the seat plate and the sleeve is press fit into the wheelbase. A fastened socket in the seat plate receives the rod, and a socket—generally a circular hole—in the wheelbase receives the sleeve. When the chair is assembled in this fashion and a user sits in the chair, the rod and sleeve further press into the seat plate and the wheelbase, setting the gas cylinder securely. Over just a few hours, the gas cylinder is driven into a firm and very secure press-fit engagement with the seat plate and the wheelbase. Over days, months, and years, the gas cylinder becomes nearly permanently seated into the seat plate and the wheelbase.

Nevertheless, office chairs do sometimes need to be moved, such as is the case for chairs used in the conference industry. When chairs are transported and stored, instead of being packed and stored neatly like tables, screens, or speakers, the workers actually throw the chairs into an open back of a truck. This causes a fair amount of damage to the chairs. Wheelbases break, casters are torn off, arm rests shatter. In a short amount of time, a chair treated in this manner must be replaced. An improvement which allows a chair to be more readily packed, transported, and stored is needed. Such a device would not only be useful for disassembling office chairs, but also for disassembling high-top tables that use gas cylinders as the supporting leg or legs. Indeed, such a device would be useful for a variety of situations in which a body is press-fit onto a round fixture such as a gas cylinder.

SUMMARY OF THE INVENTION

A gas cylinder quick release device has an upper bearing plate, and a lower annular collar arranged below the upper bearing plate on an axis common to the upper bearing plate and the lower annular collar. A handle is mounted to move between a first position and a second position. Movement of the handle from the first position to the second position imparts axial displacement of the upper bearing plate and the lower annular collar away from each other along the axis. The lower annular collar moves downward along the axis when the lower annular collar is axially displaced away from the upper bearing plate.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings:

FIGS. 8A and 8B are section views taken along the line 8-8 in FIG. 6 showing the gas cylinder quick release device of FIG. 6 in operative and expanded conditions, applied on a gas cylinder and a wheelbase;

DETAILED DESCRIPTION

Figure 1:
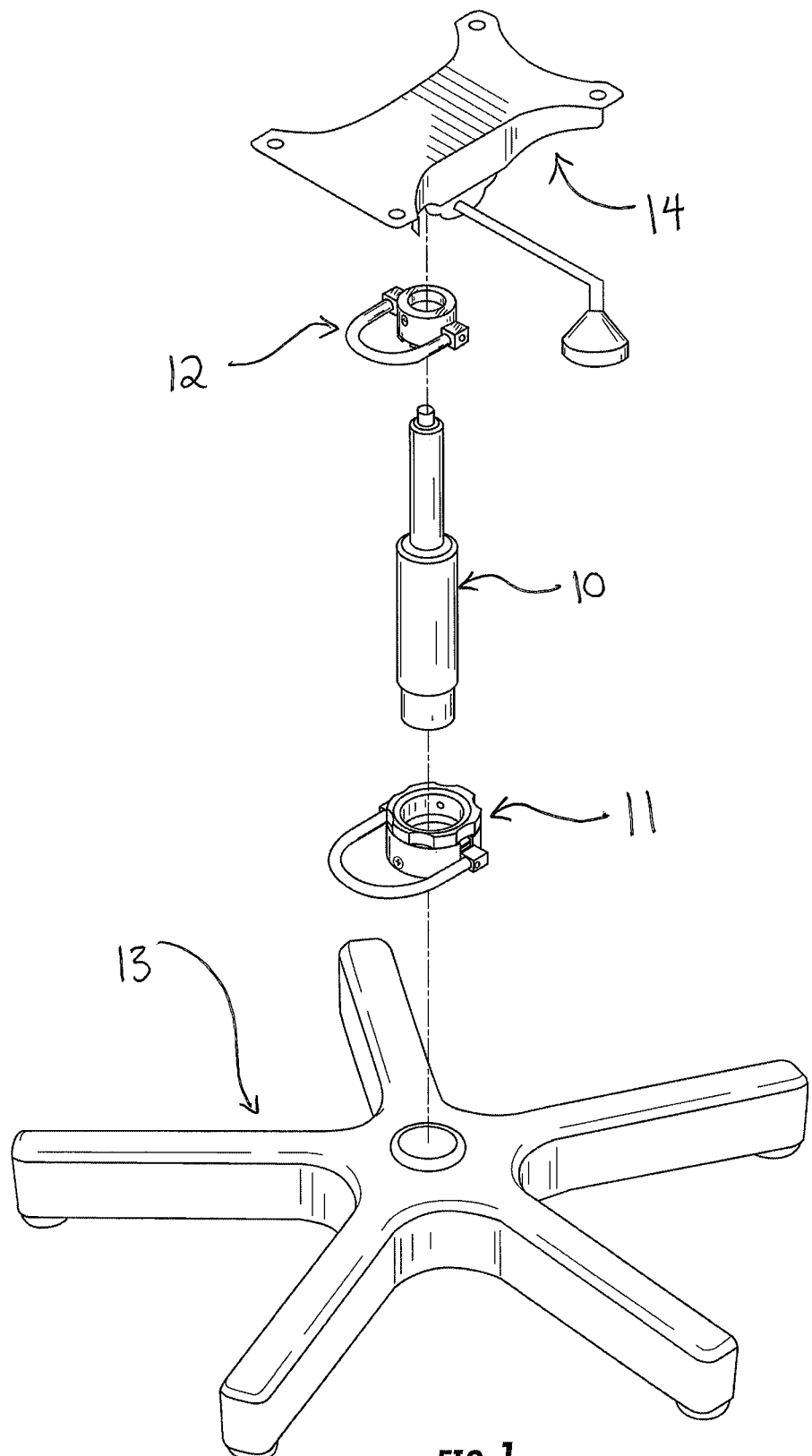
FIG. 1 is an exploded view of upper and lower embodiments of a gas cylinder quick release device, together with a wheelbase and a baseplate of a chair.

Reference now is made to the drawings, in which the same reference characters are used throughout the different figures to designate the same elements. The drawings illustrate various embodiments of devices useful for removing a fixture press-fit onto a gas cylinder 10. For instance, FIG. 1 illustrates two nearly-identical gas cylinder quick release devices 11 and 12 (hereinafter, "device 11" and "device 12") which are useful for removing a wheelbase 13 or a seat baseplate 14 from the gas cylinder 10 of an exemplary high-back office chair (not fully shown). The devices 11 and 12 may be slipped over the gas cylinder 10 before assembly of the gas cylinder 10 onto the wheelbase 13 or the baseplate 14, respectively. The devices 11 and 12, once fixed, can quickly and easily be operated without tools to bias against and urge the wheelbase 13 or baseplate 14 off of the gas cylinder 10 by breaking the press-fit arrangement formed therebetween.

FIGS. 1-5B illustrate the device 11. The devices 11 and 12 are identical in structure, function, and every other way but for size and orientation, and so the ensuing description of the device 11 applies equally to the device 12. Both of the devices 11 and 12, and the various structural elements thereof, are constructed out of a strong, light, and durable material, such as aluminum, brass, other metal, or hard plastic. The device 12 is slightly smaller than the device 11, as the device 12 fits on a narrower-diameter portion of the gas cylinder 10 and is inverted thereon so that it can urge the baseplate 14 off the gas cylinder. One having ordinary skill in the art will of course appreciate that the devices 11 and 12 are exemplary of just two sizes, and that many other sizes may be manufactured and used without departing from the spirit of this disclosure. It is further noted here that the quick release device 11 is suitable for use with gas cylinders in any type of furniture where a snug press-fit coupling is used to secure one part to another. One having ordinary skill in the art will readily appreciate that office chairs and table tops with pneumatic legs are particularly suited for use with the device 11, but the device 11 is not intended to be limited to just those types of furniture and could be used with any fitting or fixture press-fit onto a cylindrical member.

Figure 2:
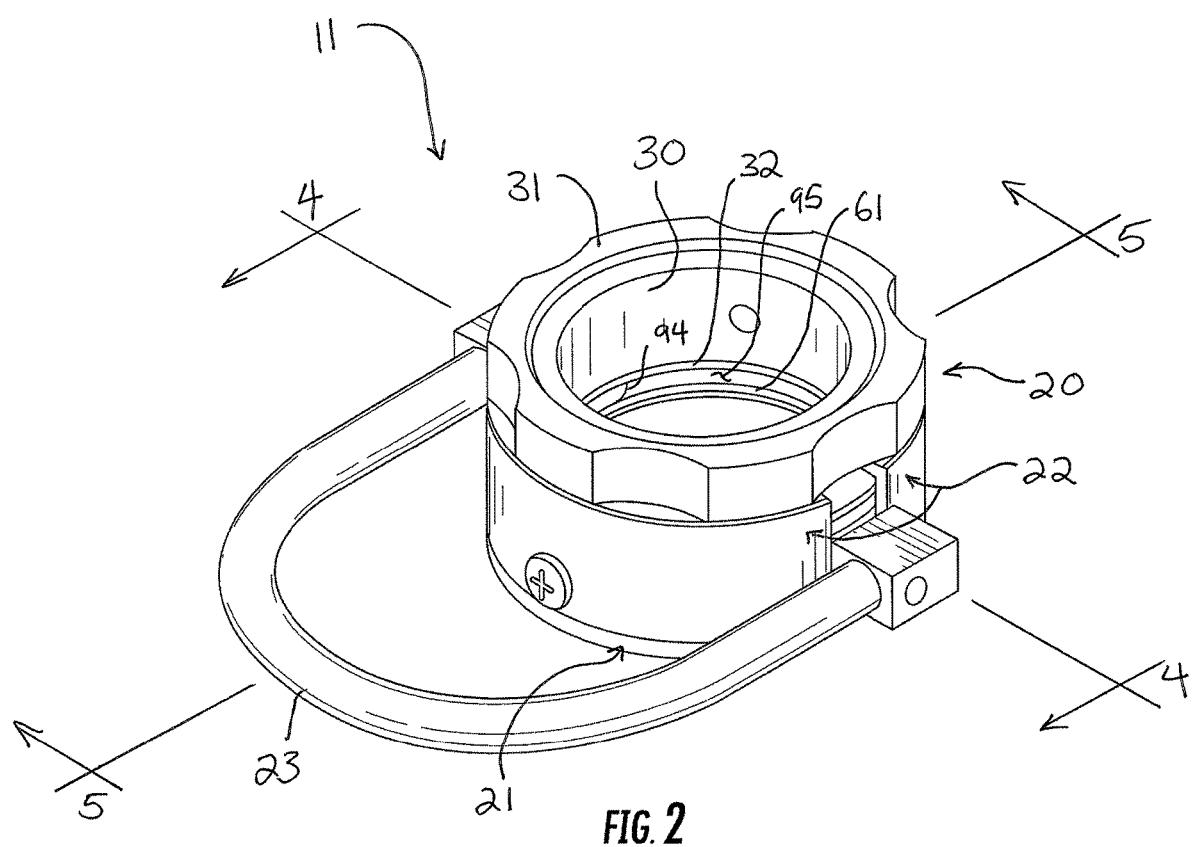
FIG. 2 is an assembled, top perspective view of the lower embodiment of the gas cylinder quick release device of FIG. 1.
Figure 3:
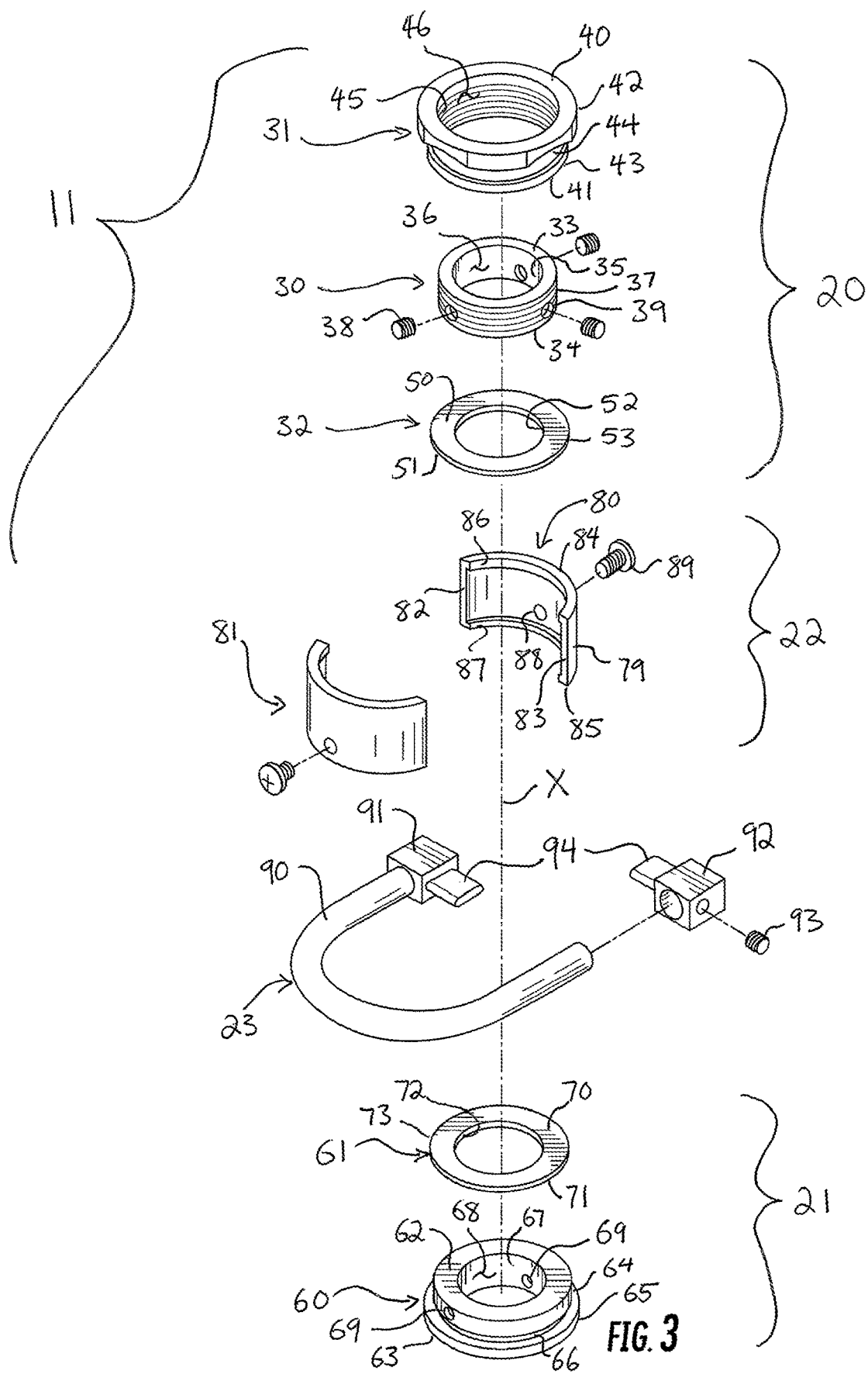
FIG. 3 is an exploded view of the lower embodiment of the gas cylinder quick release device of FIG. 1.

FIGS. 2 and 3 show the device 11 in more detail. The device 11 includes an upper assembly 20, a lower assembly 21, a two-piece collar 22, and a handle 23. The handle 23 is disposed between the upper and lower assemblies 20 and 21 and mounted for pivotal movement between a neutral first position and a pivoted or raised second position to impart expansion to the device 11 from an operative condition to an expanded condition. In the operative condition, the upper and lower assemblies 20 and 21 are proximate to each other and the device 11 has a contracted axial length. In the expanded condition, however, the upper and lower assemblies 20 and 21 are biased apart and the device 11 acquires an extended axial length to push the wheelbase 13 off the gas cylinder 10.

Turning now to FIG. 3, the upper assembly 20 includes a sleeve 30, a nut 31 threadably engaged over the sleeve 30, and a washer 32 carried below the sleeve 30 and nut 31. The upper assembly 20 fixes the entire device 11 to the gas cylinder 10 so that the handle 23 can bias the lower assembly 21 away from the upper assembly 20 to move the device 11 into the expanded condition and pop the wheelbase 13 off the gas cylinder 10. The upper assembly is generally cylindrical and symmetric with respect to an axis X.

The sleeve 30 is a hard, durable, and rigid cylindrical sidewall having a top 33, an opposed bottom 34, a smooth inner surface 35 defining an inner volume 36, and a threaded outer surface 37. The top 33 and bottom 34 are each flat, smooth, and generally normal to an axis of symmetry for the sleeve 30. The sleeve 30 is incompressible and as such cannot be deformed or compressed in the vertical direction between the top 33 and bottom 34. The inner surface 35 is featureless but for three circumferentially-spaced apart threaded holes 39 extending radially through the sidewall of the sleeve 30 entirely from the outer surface 37 through to the inner surface 35. By "featureless," it is meant that the inner surface 35 is smooth and lacks projections, indentations, bumps, holes, or other features deviating from the inner surface 35, except for the holes 39 specified. The holes 39 are disposed at a generally intermediate location between the top 33 and bottom 34. Short set screws 38 are threadably engaged with each of the holes 39, so that the sleeve 30 can be fixed to the sidewall of the gas cylinder 10. In other embodiments, the sleeve 30 is adhered to the gas cylinder 10, and in still other embodiments, the sleeve 30 is formed integrally as part of the sidewall of the gas cylinder 10, where the gas cylinder 10 simply has externally-directed threads.

The nut 31 has a hard, durable, and rigid generally cylindrical body including a top 40, an opposed bottom 41, an upper ring 42 at the top 40, a lower flange 43 at the bottom 41, and a reduced-diameter sidewall 44 extending between the upper ring 42 and the lower flange 43. The upper ring 42 and the lower flange 43 are axially vertically spaced apart by the height of the sidewall 44. An inner surface 45, bounding a cylindrical inner volume 46 within the nut 31, is formed with threads that correspond in pitch to the threaded outer surface 37 of the sleeve 30. The upper ring 42 is an enlarged annular head of the nut 31 and is formed with a plurality of spaced-apart concave recesses about its periphery, such that the upper ring 42 is suitable to be easily gripped by hand for turning the nut 31.

The entire nut 31 is incompressible, and the lower flange 43 is especially durable, rigid, and incompressible: it is not capable of being deformed or deflected even under great forces, as the lower flange 43 is a stop against expansive movement of the device 11 from the operative condition to the expanded condition, and is thus strong enough to prevent further movement despite great force necessary to initiate such movement.

The lower flange 43 has an outer diameter less than that of the upper ring 42 but greater than that of the sidewall 44. In this way, the upper ring 42 extends radially out further from the body than the lower flange 43. When the two-piece collar 22 is fit onto the nut 31, the lower flange 43 fits within the collar 22, and the upper ring 42 is slightly outboard of the collar 22 and thus available to be gripped.

The washer 32 has an upper surface 50, a lower surface 51, and opposed inner and outer edges 52 and 53. The upper and lower surfaces 50 and 51 are flat, parallel, and smooth, and both have a low coefficient of friction such that they are good bearing surfaces. The inner edge 52 defines an inner diameter of the washer 32 which is coextensive to an inner diameter of the sleeve 30 and coextensive to an outer diameter of the gas cylinder 10. The outer edge 53 defines an outer diameter which is coextensive to an outer diameter of the lower flange 43 of the nut 31. As such, when the nut 31 is coaxially and threadably engaged on the sleeve 30, and the washer 32 is disposed below both the sleeve 30 and the nut 31, the washer 32 is in direct and flush contact with the bottoms 34 and 41 of the sleeve 30 and nut 31, respectively. The washer 32 thus entirely covers the bottoms 34 and 41 and provides a bearing surface against the bottoms 34 and 41.

Still referring to FIG. 3, opposite the device 11 from the upper assembly 20 is the lower assembly 21. While the upper assembly 20 is fixed to the gas cylinder 10 by the set screws 38, the lower assembly 21 rides on the gas cylinder 10, moving in an axially reciprocal fashion down and up the gas cylinder 10 with respect to the upper assembly 20, to move the device 11 between the expanded and operative conditions, respectively. The lower assembly 21 is generally cylindrical and coaxial to the common axis X, and it includes a runner 60 and a washer 61. The runner 60 has a hard, durable, and rigid generally cylindrical body including a top 62, an opposed bottom 63, an upper flange 64 at the top 62, a base 65 at the bottom 63, and a reduced-diameter sidewall 66 extending between the upper flange 64 and the base 65. An inner surface 67, bounding a cylindrical inner volume 68 within the runner 60, is smooth and uninterrupted by projections, indentations, bumps, or other features except for two holes 69. The annular base 65 has an outer diameter which is greater than an outer diameter of the upper flange 64, which in turn is greater than the outer diameter of the sidewall 66. As such, the sidewall 66 defines an annular inner wall of a channel or groove bound on upper and lower ends by the upper flange 64 and the base 65, respectively. The upper flange 64 of the runner 60 has two threaded holes 69 formed entirely through the upper flange 64, to allow the upper flange 64 to be coupled to the two-piece collar 22.

The washer 61 has an upper surface 70, a lower surface 71, and opposed inner and outer edges 72 and 73. The upper and lower surfaces 70 and 71 are flat, parallel, and smooth, and both have a low coefficient of friction such that they are good bearing surfaces. The inner edge 72 defines an inner diameter of the washer 61 which is coextensive to the inner diameter of the sleeve runner 60. The outer edge 73 defines an outer diameter which is coextensive to the outer diameter of the upper flange 64 of the runner 60. As such, when the washer 61 is disposed on top of the runner 60, it is in direct and flush contact with the top 62 of the runner 60. The washer 61 thus entirely covers the top 62 of the runner 60 and provides a bearing surface against the top 62.

The collar 22 is a movable coupling, carried between the upper and lower assemblies 20 and 21. The collar 22 slidably reciprocates along the sidewall 44 of the nut 31 to allow the device 11 to move between the operative condition and the expanded condition. The collar 22 is hard, durable, rigid, incompressible, and non-deformable. The collar 22 includes a first piece 80 and a second piece 81. The first and second pieces 80 and 81 are identical and interchangeable, and description herein will be made with reference primarily to the first piece 80, with the understanding that the description applies equally to the second piece 81. The first piece 80 has a C-shaped or semi-cylindrical thin sidewall 79 extending between two opposed blunt ends 82 and 83. The first piece 80 has a top 84 and opposed bottom 85, at which inwardly-turned upper and lower lips 86 and 87 are formed, respectively. The upper and lower lips 86 and 87 are directed perpendicular to the sidewall 79, and project radially inwardly slightly, overhanging the sidewall 79. A bore 88 is formed entirely through the sidewall centrally between the blunt ends 82 and 83, proximate to the bottom 85. The bore 88 is smooth and unthreaded. A small bolt or set screw 89 with an enlarged head is passed through the bore 88 and threadably engages one of the holes 69 in the upper flange 64 of the runner 60.

Still referring to FIG. 3, the handle 23 is shown in a partially exploded arrangement. The handle 23 includes a rigid, tubular, U-shaped member 90 with opposed ends fitted and secured with caps 91 and 92. The caps 91 and 92 are snug fit onto free ends of the U-shaped member 90 and secured with set screws 93 through the caps 91 and 92. A cam 94 extends inwardly from each of the caps 91 and 92 and is wide, flat, and thin. When the caps 91 and 92 are applied to the free ends of the U-shaped member 90, the cams 94 are aligned with and coplanar to the U-shaped member 90.

Referring now to FIGS. 1-3, in operation, the devices 11 and 12 are installed on a chair, preferably during manufacture or during initial assembly of the chair by the user. One having ordinary skill in the art will readily appreciate that the devices 11 and 12, though described herein with respect to operation with a chair, may also be used with tables and other furniture or devices in which a fitting or fixture is press-fit onto a gas cylinder or other cylindrical member. One having ordinary skill in the art will also readily appreciate that the devices 11 and 12 may be used with gas cylinders of different sizes and diameters, and that such interchangeability is easily accommodated by changing the inner diameter or proportions of the devices 11 and 12, without changing their structural elements, features, and operation. Indeed, the devices 11 and 12 show two differently-sized embodiments which have identical structural elements, features, and operations.

Before the gas cylinder 10 is installed into the wheelbase 13 or the baseplate 14, the device 11 is applied onto the bottom of the gas cylinder 10, and the device 12 is applied onto the top of the gas cylinder 10. To assemble the device 11, the following steps are preferably taken. The sleeve 30 is passed onto the gas cylinder 10 and secured proximate to the bottom of the gas cylinder 10 by tightening the set screws 38 through the threaded holes 39 and against the outer surface of the gas cylinder 10. The sleeve 30 is thereby fixed at a set, predetermined distance from the bottom of the gas cylinder 10, which distance allows the device 11 to properly operate according to the below description. Tightening the set screws 38 locks the sleeve 30 in place, preventing both axial and rotational movement of the sleeve 30 with respect to the gas cylinder 10 and establishing the sleeve 30 as an anchor for the device 11 on the gas cylinder 10 from which the device 11 can expand. The nut 31 is threaded onto the sleeve 30, preferably until the bottom 41 of the nut 31 is flush with the bottom 34 of the sleeve 30. The washers 32 and 61 are next applied to the gas cylinder 10. The washer 32 is placed against the bottoms 34 and 41 of the sleeve 30 and the nut 31, respectively, and the other washer 61 is just below it. Next, the runner 60 is slipped onto the gas cylinder 10 so that it is disposed just below the washer 61.

The handle 23 is then installed. The cams 94 of the handle 23 are inserted between the two washers 32 and 61 so that a gap 95 is formed therebetween, as shown in FIG. 2. In this arrangement, the two-piece collar 22 can now be applied over the nut 31, the washers 32 and 61, and the runner 60. The first piece 80 of the collar 22 is fit onto the upper and lower assemblies 20 and 21. The upper lips 86 of the first and second pieces 80 and 81 are placed against the recessed sidewall 44 of the nut 31 between its upper ring 42 and lower flange 43. Similarly, the lower lips 87 of the first and second pieces 80 and 81 are placed against the recessed sidewall 66 between its upper flange 64 and base 65. Thus, the upper lips 86 overlap the upper assembly 20 in lapping engagement, and the lower lips 87 overlap the lower assembly 21 in lapping engagement. In this way, the collar 22 is loosely coupled to the upper and lower assemblies 20 and 21.

Then, the small set screw 89 is passed through the bore 88 in the first piece 80 and threadably engaged with one of the threaded holes 69 in the upper flange 64 of the runner 60. The second piece 81 is also fit onto the assembly, and the other small set screw 89 is passed through the other bore 88 and threadably engaged with the other threaded hole 69 in the upper flange 64 of the runner 60. In this way, the two-piece collar 22 is fixed to the runner 60 of the lower assembly 21 and clamped over the nut 31 of the upper assembly 20. The free ends 82 and 83 of the first and second pieces 80 and 81 are circumferentially spaced apart from each other by the width of the cams 94 disposed therebetween.

Figure 4A:
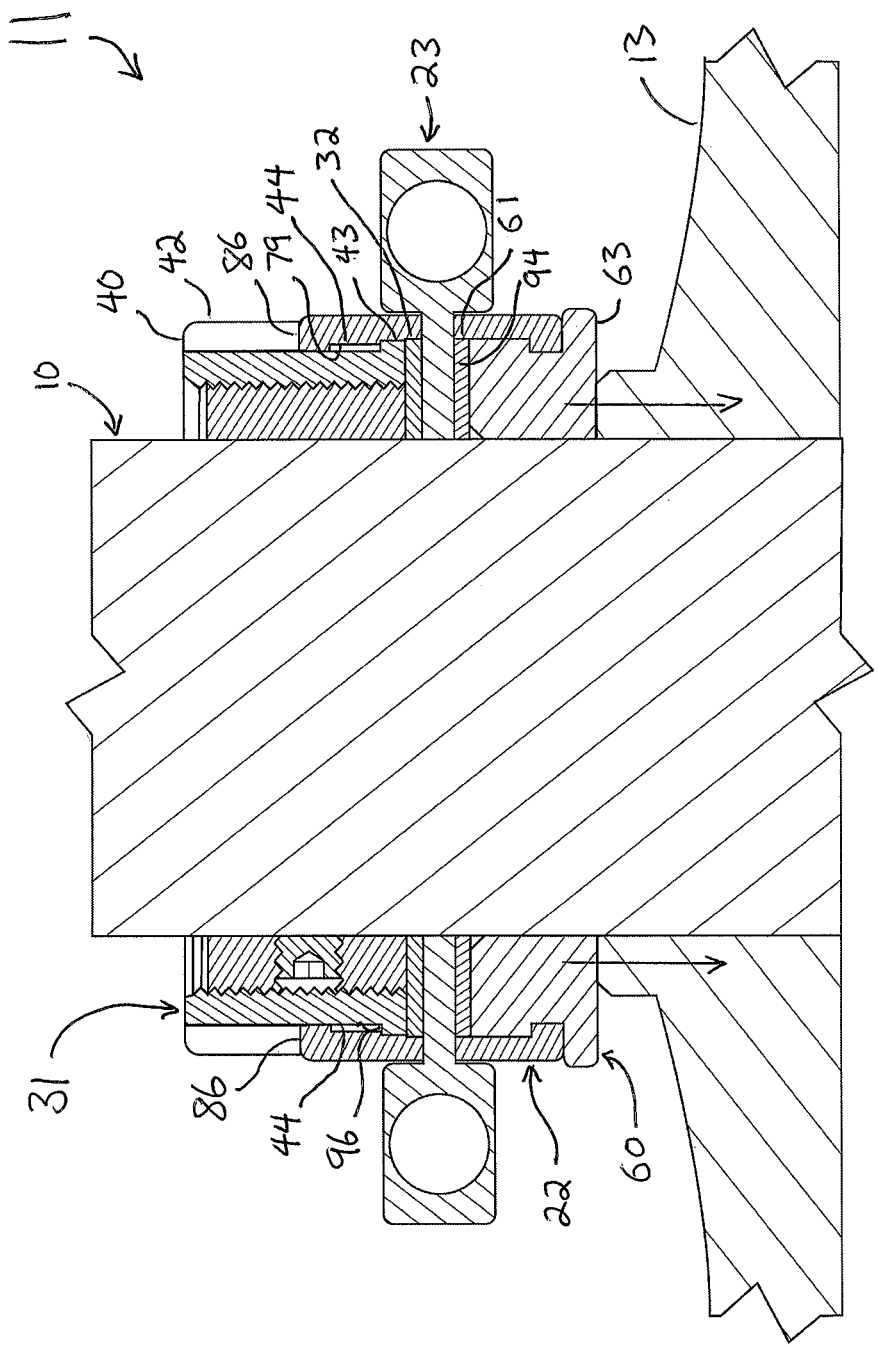
FIGS. 4A-5B are section views taken along the lines 4-4 and 5-5 in FIG. 2 showing the lower embodiment of the gas cylinder quick release device of FIG. 1 in operative and expanded conditions, applied on the gas cylinder and wheelbase.

Once the device 11 is so assembled, the wheelbase 13 is fit onto the gas cylinder 10. When the device 11 is properly distanced from the bottom of the gas cylinder 10, the wheelbase 13 slips onto the gas cylinder until a top of the wheelbase 13 encounters and pushes up on the bottom 63 of the runner 60, as shown in FIG. 4A, or until the wheelbase 13 is just a slight distance below; when a user sits on the chair, the gas cylinder 10 will slide deeper into the wheelbase 13 and this slight distance will be eliminated, so that the top of the wheelbase 13 is flush against the bottom 63 of the runner 60. If the device 11 is above or not flush with the wheelbase 13 even after a user has sat on the chair, however, the user can simply rotate the nut 31 on the threaded sleeve 30 so as to threadably advance the lower assembly 21 axially downward and consume any gap between the bottom 63 of the runner 60 and the top of the wheelbase 13.

Figure 5A:
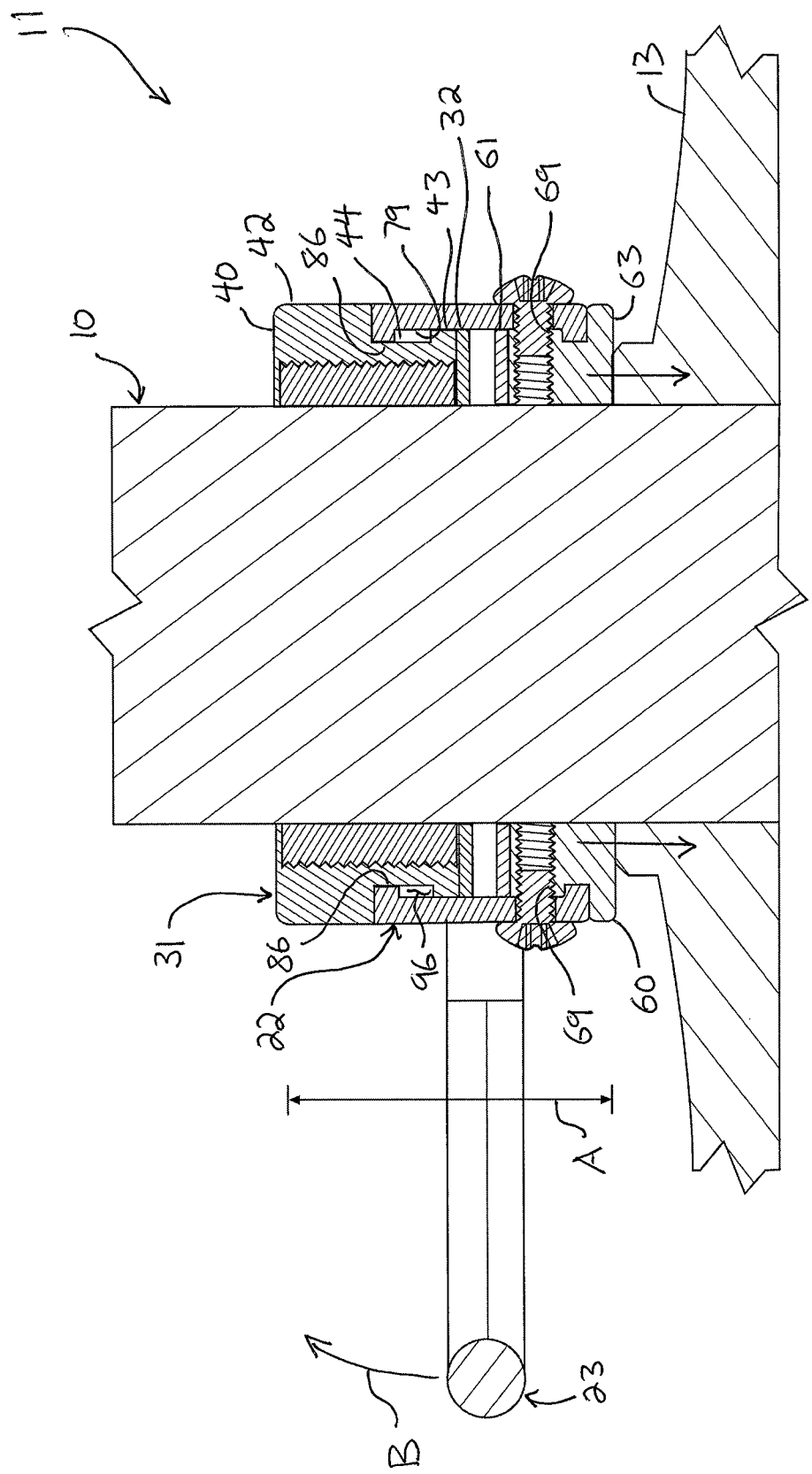

FIGS. 4A and 5A show the device 11 in the operative condition. FIG. 4A is a section view taken along the line 4-4 in FIG. 2, and FIG. 5A is a section view taken along the line 5-5 in FIG. 2. The bottom 63 of the runner 60 is in flush contact against the wheelbase 13, and the lower assembly 21 is pushed upward along the gas cylinder 10: the upper lips 86 of the two-piece collar 22 surround and encircle the sidewall 44 of the nut 31 in a snug-fit engagement, and so the upper lips 86 slide upwardly along the sidewall 44 until they encounter the upper ring 42 of the nut 31. The upper ring 42 prevents further upward movement of the lips 86 and thus of the lower assembly 21 with respect to the upper assembly 20. In this condition, the device 11 assumes its shortest, most compact, or most contracted length. The device 11 has a contracted axial length A (shown in FIG. 5A) between the top 40 of the nut 31 and the bottom 63 of the runner 60.

In this operative condition, there exists a small amount of axially downward play between the upper and lower assemblies 20 and 21. The upper lips 86 of the two-piece collar 22 lap over the lower flange 43 of the nut 31 in lapping engagement, and together with the sidewalls 44 and 79 of the nut 31 and the collar 22, define an annular gap 96. This gap 96 provides play or room for the two-piece collar 22 to move axially along the nut 31.

Figure 4B:
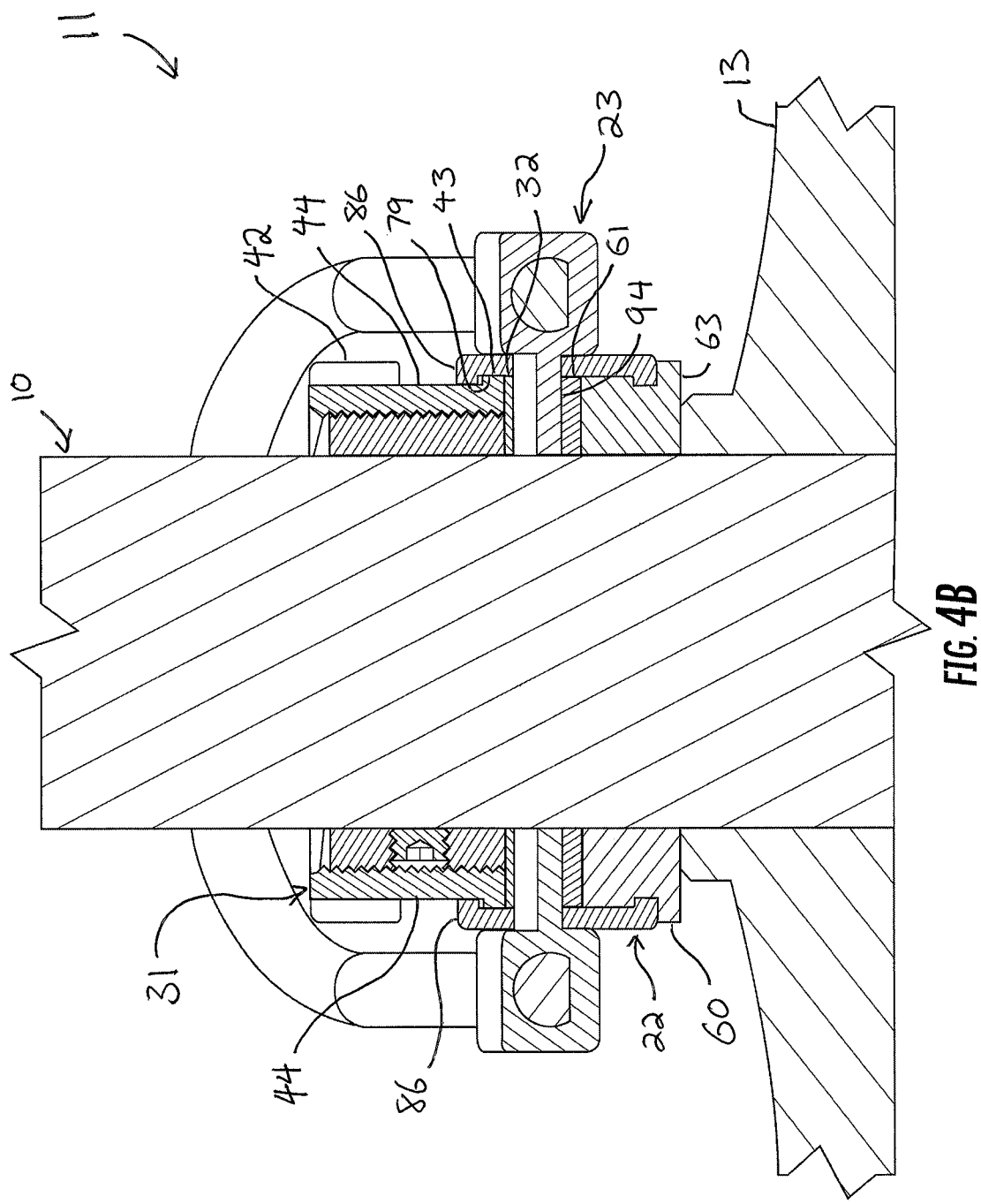
Figure 5B:
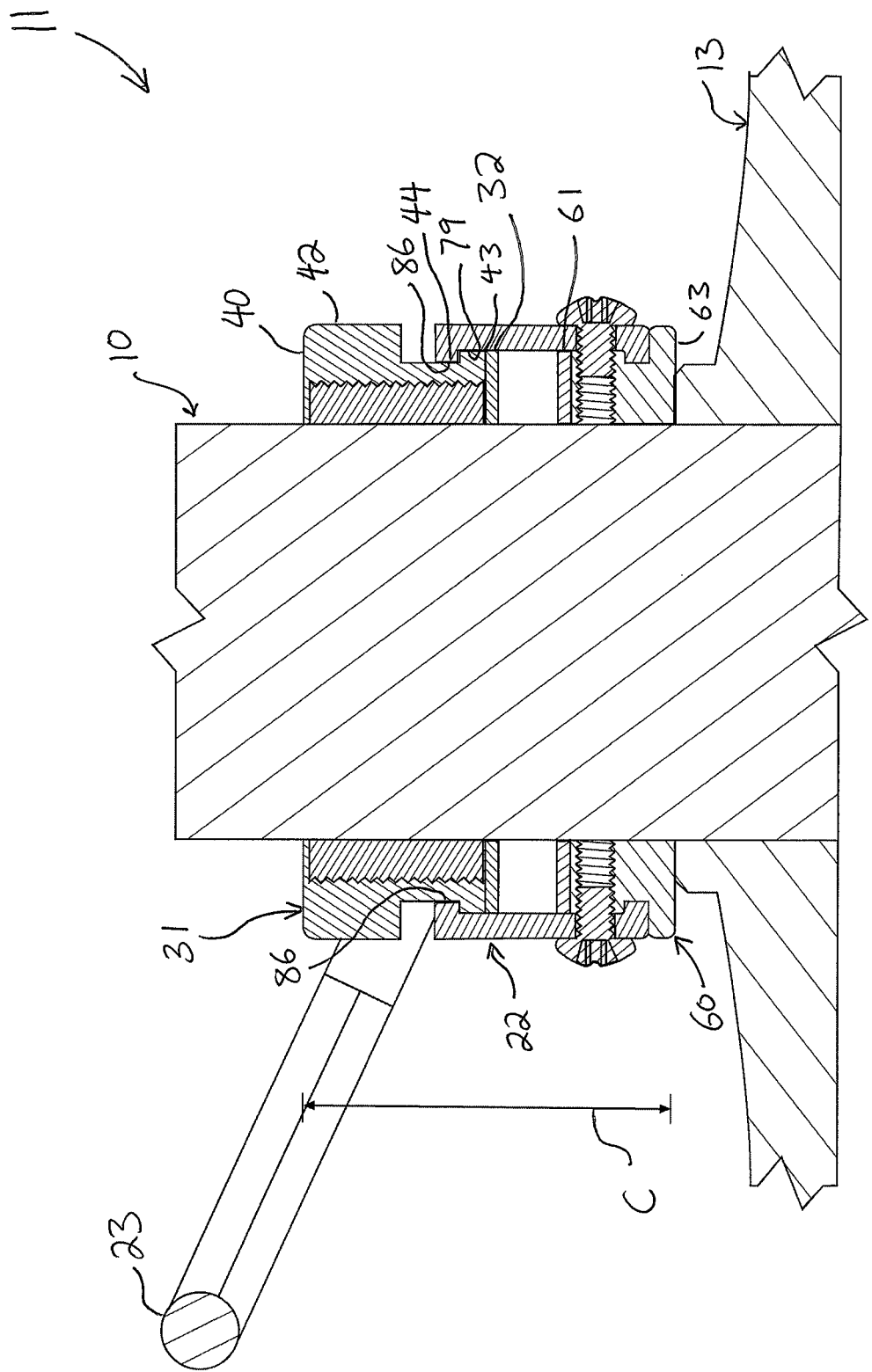

To move the device 11 from the operative condition to the expanded condition, the user merely pivots the handle 23, such as by pulling it upwardly along the arrowed line B (in FIG. 5A) from a first position in FIGS. 4A and 5A to a second position in FIGS. 4B and 5B. This arranges the device 11 from the operative condition shown in FIGS. 4A and 5A to the expanded condition shown in FIGS. 4B and 5B. Pivoting the handle 23 imparts a pitching movement to the cams 94, which are rigidly fixed to the U-shaped handle 23. The cams 94 are diametrically opposed from each other, and as they pitch, their diagonally-offset corners contact and depress the washers 32 and 61 at opposed locations. The cams 94 thus produce an axially-expansive force tending to push the washers 32 and 61 away from each other. However, because the upper assembly 20 is secured to the gas cylinder 10 at the sleeve 30 by the set screws 38, it does not move. Instead, the lower assembly 21 moves axially downward along the gas cylinder 10 and along the upper assembly 20.

The lower assembly 21 moves axially downward until the upper lips 86 of the two-piece collar 22 encounter the lower flange 43 of the nut 31 on the upper assembly 20, which prevents further downward movement. The device 11 acquires a new expanded axial length C between the top 40 of the nut 31 and the bottom 63 of the runner 60. The upper and lower assemblies 20 and 21 have thus been axially displaced: the expanded axial length C is slightly longer than the contracted axial length A, by several millimeters. When the lower assembly 21 moves downward these several millimeters, because the runner 60 is rigid and incompressible, all force applied to the runner 60 by the collar 22 and the washer 61 is directed into the wheelbase 13. The runner 60 thus pushes down on the top of the wheelbase 13 and moves the wheelbase 13 those same several millimeters down the gas cylinder 10. Because the cams 94 are diametrically offset, they cause impart those several millimeters of downward movement evenly around the lower assembly 21, and thus the lower assembly 21 moves evenly downward without tilting, pivoting, or buckling. Because the gas cylinder 10 has a slight taper near its bottom, moving the wheelbase 13 a few millimeters downward is a sufficient distance to loosen the tight press-fit between the wheelbase 13 and the gas cylinder 10, and so the wheelbase 13 can now be easily removed by hand.

The device 12 is assembled and operated in a similar fashion, but with an inverted orientation. The device 12 is useful for popping the baseplate 14 of the seat off of the top of the gas cylinder 10.

FIGS. 6-8B illustrate an embodiment of a gas cylinder quick release device 110 ("device 110") for use also with a gas cylinder 10. The device 110 is mounted to the gas cylinder 10, and can be applied to any cylindrical member to which a fitting or fixture is press-fit, like the devices 11 and 12 can. The device 110 may be slipped over the gas cylinder 10 before assembly of the gas cylinder 10 onto the wheelbase 13. Like the device 11, a smaller embodiment of the device 110 is used to detach the baseplate 14 from the gas cylinder 10. Though not shown, one having ordinary skill in the art would readily appreciate that the smaller embodiment is identical in structure and function to the device 110, though smaller to accommodate the smaller-diameter top of the gas cylinder 10. As such, the smaller embodiment of the device 110 is not described or shown herein. The device 110 is mounted at the bottom of the gas cylinder 10, proximate to the wheelbase 13. Once fixed on the gas cylinder 10, the device 110 can quickly and easily be operated without tools to bias against and urge the wheelbase 13 off of the gas cylinder 10 by breaking the press-fit arrangement formed therebetween, but not by breaking the chair.

Figure 6:
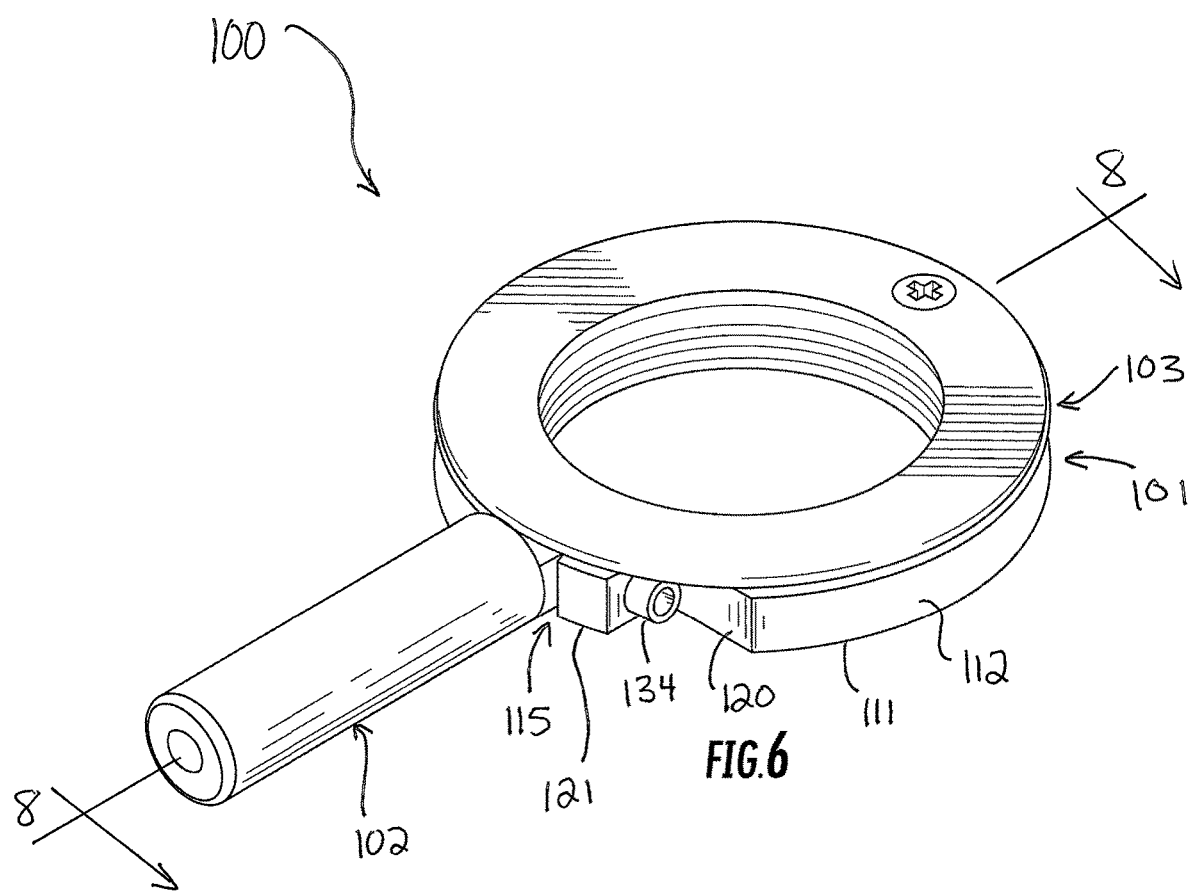
FIGS. 6 and 7 are assembled and exploded top perspective views of an embodiment of a gas cylinder quick release device.
Figure 7:
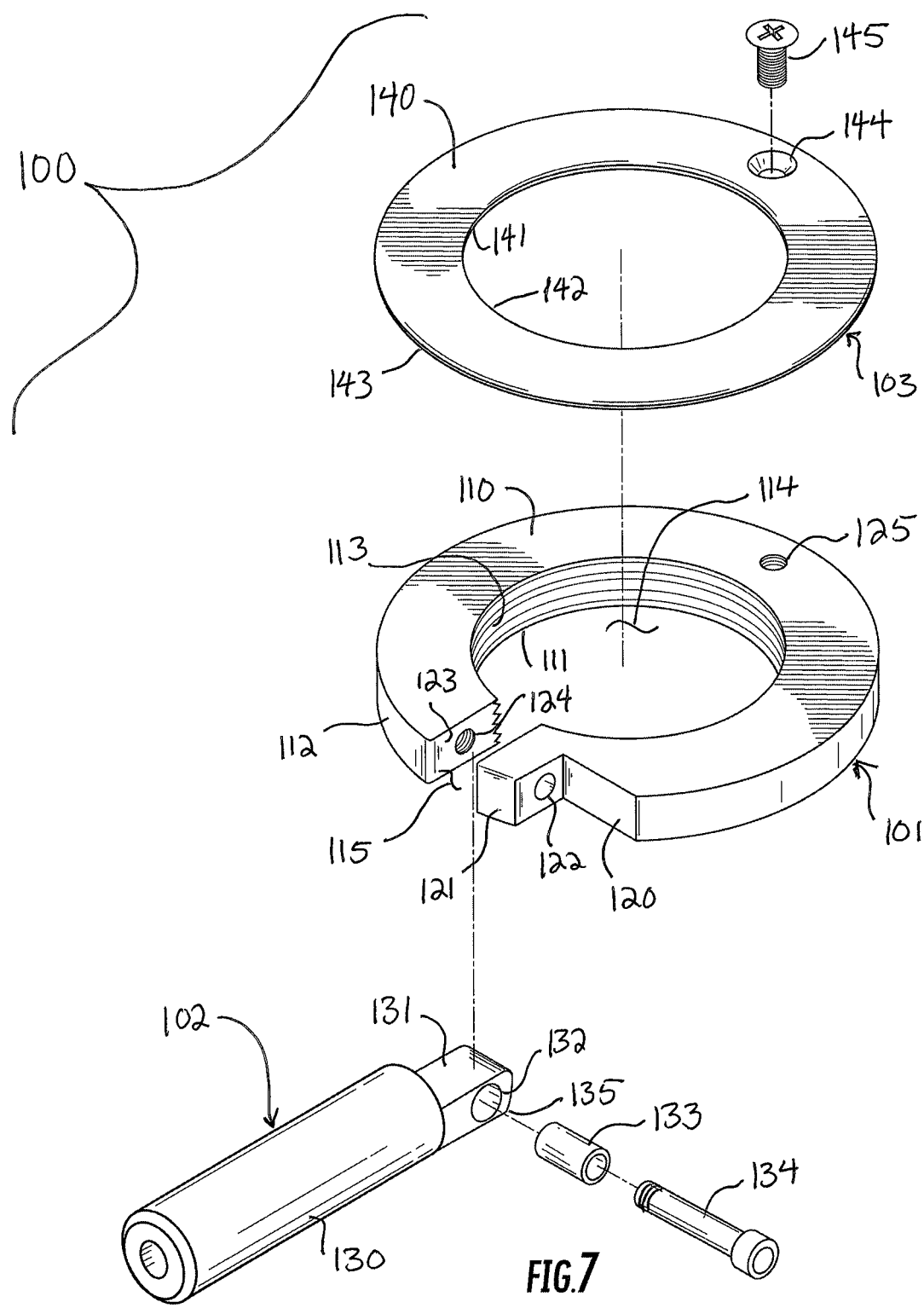

FIGS. 6 and 7 show the device 110 in enlarged detail. The device 110 includes a generally annular collar 101, a handle 102 pivoted to the collar 101, and a bearing plate 103 fixed to the collar 101. The device 110 moves between an operative condition and an expanded condition, in which the handle 102 is pivoted and biases the bearing plate 103 away from the collar 101. When the device 110 is properly applied to the gas cylinder 10 with the bearing plate 103 against the wheelbase 13 as shown in FIGS. 8A and 8B, movement of the device 110 from the operative condition to the expanded condition urges the wheelbase 13 down off of the gas cylinder 10. The device 110 and its structural elements are constructed out of a strong, light, and durable material, such as aluminum, brass, other metal, or hard plastic.

The collar 101 is a hard, durable, and rigid generally annular severed sidewall having a bottom 110, an opposed top 111, a smooth outer surface 112, and an opposed inner surface 113 defining an inner volume 114. Briefly, it is noted that FIGS. 6 and 7 show the device 110 in a top-down, bottom-up orientation because it more clearly illustrates the collar 101, handle 102, and bearing plate 103. The reader should keep in mind that this is an inverted orientation for the device 110, which is shown in FIGS. 8A and 8B in the typical orientation, mounted against the wheelbase 13. As such, the bearing plate 103 is typically considered a lower assembly, and the collar 101 is typically considered an upper assembly. The bottom 110 and top 111 are both flat, smooth, and generally normal to an axis of symmetry for the collar 101. The collar 101 is incompressible and as such cannot be deformed or compressed in the vertical direction between the bottom 110 and the top 111. The inner surface 113 of the collar 101 is ribbed or otherwise textured with a gripping, high-friction surface. The collar 101 is severed at a gap 115 into which the handle 102 is received for pivotal movement. The outer surface 112 is featureless but for an angled notch 120 formed proximate to the gap 115 and defining a foot 121 in the collar 101. The notch 120 extends into the collar 101, and the foot 121 projects radially outwardly therefrom, with the notch 120 opposite the gap 115. A hole 122 extends through the foot 122 toward an end 123 of the collar 101 at the gap 115. A corresponding hole 124 is formed into the end 123. While the hole 122 is smooth and not threaded, the hole 124 is threaded. The notch 120 provides space for the head of a pin applied to the holes 122 and 124. Another hole 125 is formed into the collar 101; the hole 125 is a vertical hole formed entirely through the collar 101 from the bottom 110 to the top 111. The hole 125 is threaded.

Pivoted to the collar 101 is the handle 102. The handle 102 includes a long cylindrical shank 130 for gripping and an opposed base 131 with a lateral bore 132 extending therethrough. The bore 132 receives a bushing 133 and a pivot pin 134 carried within the bushing 133. The pivot pin 134 has an enlarged head, larger than the hole 122, and a threaded end opposite the head. To mount the handle 102 to the collar 101, the pivot pin 134 is passed through the hole 122, then within the bushing 133 and the bore 132 of the handle 102, and is then threadably engaged with the hole 124. The pivot pin 134 can be tightened to close the gap 115 slightly and reduce the circumference of the collar 101. The pivot pin 134 allows the handle 102 to pivot between first and second positions, as will be explained. The handle 102 also includes a nose 135, which is an enlarged corner that projects radially outwardly away from the bore 132. This nose 135 is a bearing surface, as will be explained as well.

The bearing plate 103 is coupled to the bottom 110 of the collar 101. The bearing plate 103 is annular and has a lower surface 140, an upper surface 141, and opposed inner and outer edges 142 and 143. The lower and upper surfaces 140 and 141 are flat, parallel, and smooth, and both have a low coefficient of friction such that they are good bearing surfaces. The inner edge 142 defines an inner diameter of the bearing plate 103 which is coextensive to an inner diameter of the collar 101 and coextensive to an outer diameter of the gas cylinder 10. As such, when the device 110 is fixed on the gas cylinder 10, and the bearing plate 103 is disposed below the collar 101, the bearing plate 103 is in direct and flush contact with the bottom 110 of the collar 101 and entirely covers the bottom 110, providing a bearing surface between the collar 101 and the wheelbase 13 below. A countersunk hole 144 is formed entirely through the bearing plate 103 from the lower surface 140 through to the upper surface 141. A screw 145 is carried in the hole 144 and threadably engaged with the threaded hole 125 in the bottom 110 of the collar 101. The screw 145 binds one side of the bearing plate 103 to the bottom 110 of the collar 101, but allows the other side of the bearing plate 103 to move away from the bottom 110, so that the collar 101 and bearing plate 103 can tilt or pivot with respect to each other.

FIGS. 8A and 8B are enlarged views of the gas cylinder 10 applied to the wheelbase 13 and carrying the device 110. FIG. 8A illustrates the device 110 in an operative condition, with the handle 102 in the first position, generally parallel to the wheelbase 13. FIG. 8B illustrates the device 110 in an expanded condition, with the handle 102 in the second position thereof, pivoted up away from the wheelbase 13.

To place the device 110 in the operative condition shown in FIG. 8A, the device 110, already assembled, is slid over the gas cylinder 10, with the collar 101 directed upwardly and the bearing plate 103 directed downwardly. The gas cylinder 10 is then applied to the wheelbase 13. Preferably, someone sits on the chair so that the gas cylinder 10 seats down into the wheelbase 13. The device 110 can then be fixed on the gas cylinder 10. The device 110 is placed with the lower surface 140 of the bearing plate 103 against the wheelbase 13, and the pivot pin 134 is then tightened. Tightening the pivot pin 134 causes the circumference and diameter of the collar 101 to decrease, so that the collar 101 closes down on the gas cylinder 10. The tightness of the pivot pin 134 is increased until the collar 101 is fixed on the gas cylinder 10.

In the operative condition shown in FIG. 8A, the handle 102 is down, pivoted into the first position thereof. As such, the base 131 of the handle 102 rests on, but does not press against, the upper surface 141 of the bearing plate 103. The nose 135 of the handle 102 also is resting, but not pressing, against the upper surface 141. The bearing plate 103 is thus flat and parallel with respect to the collar 101, as it is not deformed by interaction with the handle 102.

Movement of the handle 102 along arcuate line D in FIG. 8A moves the handle 102 to the second position thereof, as shown in FIG. 8B. When the handle 102 is so moved, the nose 135 of the handle 102 bears into the upper surface 141 of the bearing plate 103. The screw 145 binding the bearing plate 103 to the collar 101 is diametrically opposed from the handle 102, and so while the screw 145 holds the bearing plate 103 and the collar 101 together proximate the screw 145, the bearing plate 103 and the collar 101 do separate proximate the handle 102. The nose 135 urges this proximate side of the bearing plate 103 downward, causing the bearing plate 103 to pivot and push against the wheelbase 13, thereby moving the wheelbase 13 a few millimeters downward. Because the gas cylinder 10 has a slight taper near its bottom, moving the wheelbase 13 a few millimeters downward is a sufficient distance to loosen the tight press-fit between the wheelbase 13 and the gas cylinder 10, and so the wheelbase 13 can now be easily removed by hand.

Figure 9:
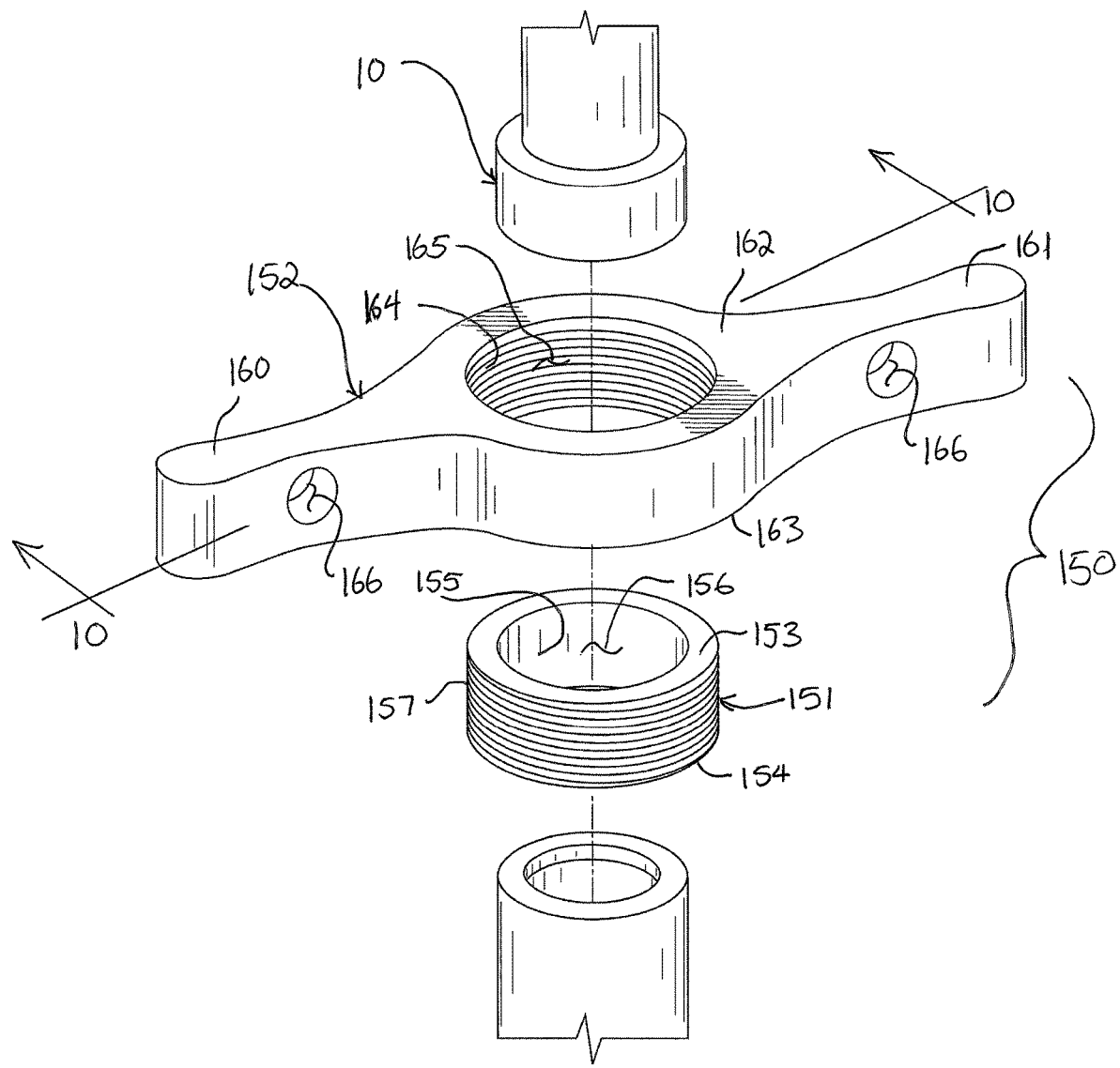
FIG. 9 is an exploded top perspective view of an embodiment of a gas cylinder quick release device.
Figure 10A:
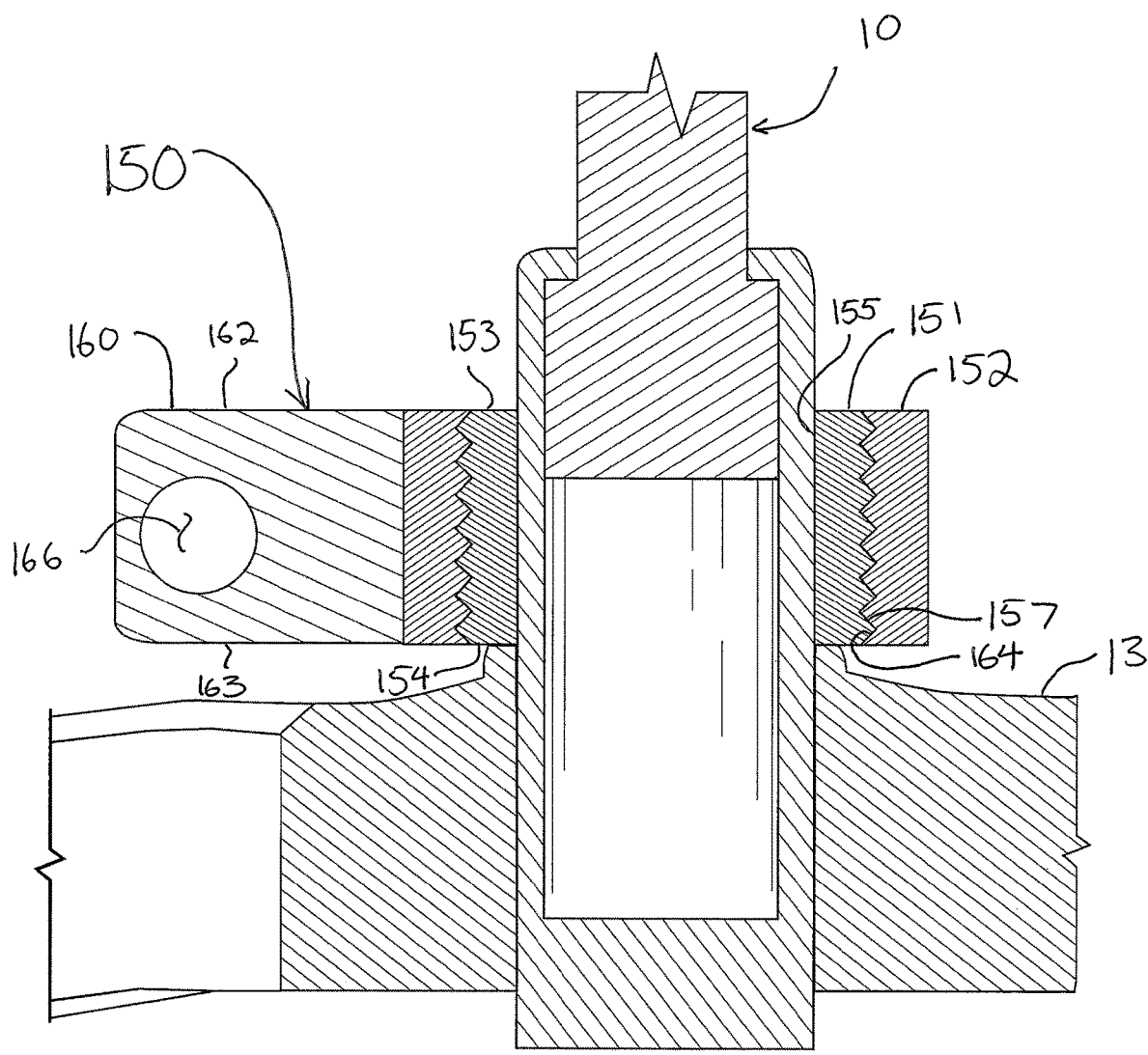
FIGS. 10A and 10B are section views taken along the line 10-10 in FIG. 9 showing the gas cylinder quick release device of FIG. 9 in operative and expanded conditions, applied on a gas cylinder and a wheelbase.
Figure 10B:
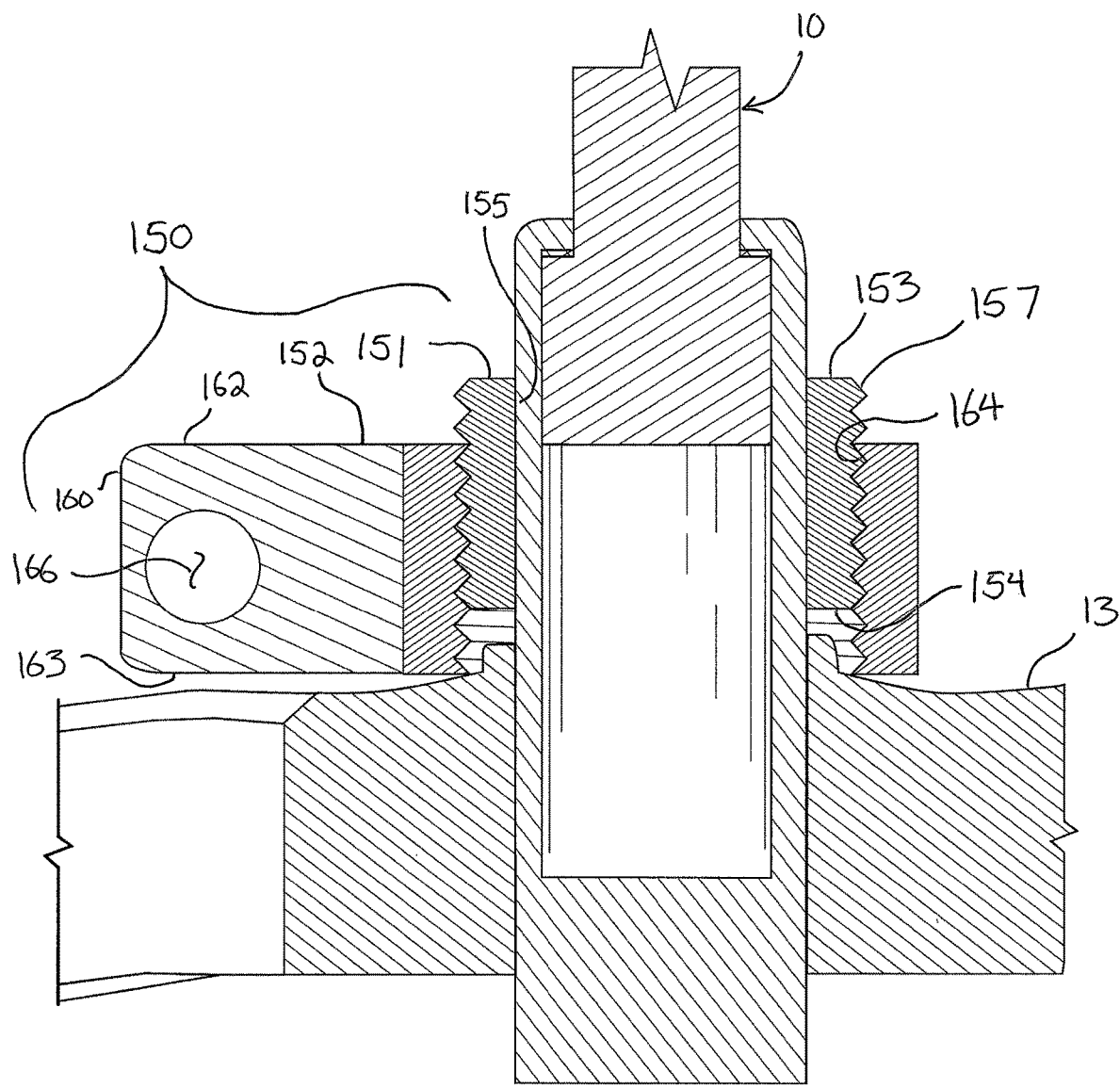

FIGS. 9-10B illustrate another embodiment of a gas cylinder quick release device 150 ("device 150"). The device includes a sleeve 151 and a wingnut 152 threadably engaged to the sleeve 151. The device 150 is mounted to the gas cylinder 10 and can be applied to any cylindrical device to which a fitting or fixture is press-fit, like the devices 11, 12, and 100. The device 150 may be slipped over the gas cylinder 10 before assembly of the gas cylinder 10 (shown exploded) onto the wheelbase 13. Like the device 11, a smaller embodiment of the device 150 is used to detach the baseplate 14 from the gas cylinder 10. Though not shown, one having ordinary skill in the art will readily appreciate that the smaller embodiment is identical in structure and function to the device 150, though it is smaller to accommodate the smaller-diameter top of the gas cylinder 10. As such, the smaller embodiment of the device 150 is not described or shown herein. The device 150 is mounted at the bottom of the gas cylinder 10, proximate to the wheelbase 13. Once fixed on the gas cylinder 10, the device 150 can quickly and easily be operated without tools to bias against and urge the wheelbase 13 off of the gas cylinder 10 by breaking the press-fit arrangement formed therebetween, but not by breaking the chair.

Referring first to FIG. 9, the sleeve 151 is a hard, durable, and rigid annular sidewall having a top 153, an opposed bottom 154, a smooth inner surface 155 defining an inner volume 156, and a threaded outer surface 157. The top 153 and bottom 154 are each flat, smooth, and generally normal to an axis of symmetry for the sleeve 151. The sleeve 151 is incompressible and as such cannot be deformed or compressed in the vertical direction between the top 153 and bottom 154. The inner surface 155 is featureless; it is smooth and lacks projections, indentations, bumps, holes, or other features deviating from the inner surface 155. In some embodiments, the inner surface 155 of the sleeve 151 includes holes, bumps, protrusions, ribs, or other elements or features to provide a grip on the gas cylinder 10. In the sleeve 151 shown in FIG. 9, however, the inner surface 155 is smooth and the sleeve 151 is pressed into a snug-fit arrangement on the gas cylinder 10. Adhesive may optionally be placed between the sleeve 151 and the gas cylinder 10 to improve the surety of the fit, or a set screw can be used to secure the sleeve 151 against the gas cylinder 10.

The wingnut 152 has a hard, durable, and rigid generally cylindrical body with two diametrically-opposed and radially-extending arms 160 and 161. The wingnut 152 further includes a top 162, an opposed bottom 163, and a threaded inner surface 164 bounding and defining a cylindrical inner volume 165. The threads formed on the inner surface 164 correspond in pitch to those formed on the outer surface 157 of the sleeve 151. The entire wingnut 152 is incompressible. The arms 160 and 161 are each formed with through-holes 166 near their distal ends; rods or other tools can be placed in the through-holes 166 to increase the lever arm and decrease the necessary force when the wingnut 152 needs to be turned on the sleeve 151.

In operation, the device 150 is installed on a chair, preferably during manufacture or during initial assembly on a chair by the user. One having ordinary skill in the art will readily appreciate the device 150, though described herein with respect to operation with a chair, may also be used with tables and other furniture or devices in which a fitting or fixture is press-fit onto a gas cylinder or other cylindrical member. One having ordinary skill in the art will also readily appreciate that the device 150 may be used with gas cylinders of different sizes and diameters, and that such interchangeability is easily accommodated by changing the inner diameter or proportions of the device 150, without changing their structural elements, features, and operation. Indeed, a smaller version of the device 150 is used at the top of the gas cylinder 10 to de-couple the baseplate 14 from the gas cylinder 10.

Before the gas cylinder 10 is installed into the wheelbase 13, the device 150 is applied onto the gas cylinder 10. The sleeve 151 is slid onto the gas cylinder 10 until it is in a snug-fit arrangement on the gas cylinder 10, proximate to the bottom where the wheelbase 13 will be. Then the wingnut 152 is threadably engaged to the sleeve 151. The bottom 163 of the wingnut 152 is preferably level or flush with the bottom 154 of the sleeve 151.

Once the device 150 is so assembled, the wheelbase 13 is fit onto the gas cylinder 10. When the device 150 is properly distanced from the bottom of the gas cylinder 10, the wheelbase 13 slips onto the gas cylinder 10 until a top of the wheelbase 13 encounters the bottoms 154 and 163 of the sleeve 151 and wingnut 152, as shown in FIG. 10A. This defines the operative condition of the device 150. The chair may now be used normally.

When it is time to disassemble the chair, the device 150 is moved into the expanded condition shown in FIG. 10B. The user merely grasps the arms 160 and 161 and rotates the wingnut on the threaded outer surface 157 of the sleeve 151. Rotation about the axis imparts downward movement of the wingnut 152 along the axis, into the wheelbase 13. The wingnut 152 can be advanced axially downward quite far, but only needs to move downward several millimeters. When the wingnut 152 has moved downward these several millimeters, because the wingnut 152 is rigid and incompressible, all force is directed into the wheelbase 13, and the wheelbase 13 also moves down those several millimeters on the gas cylinder 10. Because the gas cylinder 10 has a slight taper near its bottom, moving the wheelbase 13 a few millimeters downward is a sufficient distance to loosen the tight press-fit between the wheelbase 13 and the gas cylinder 10, and so the wheelbase 13 can now be easily removed by hand.

Figure 11:
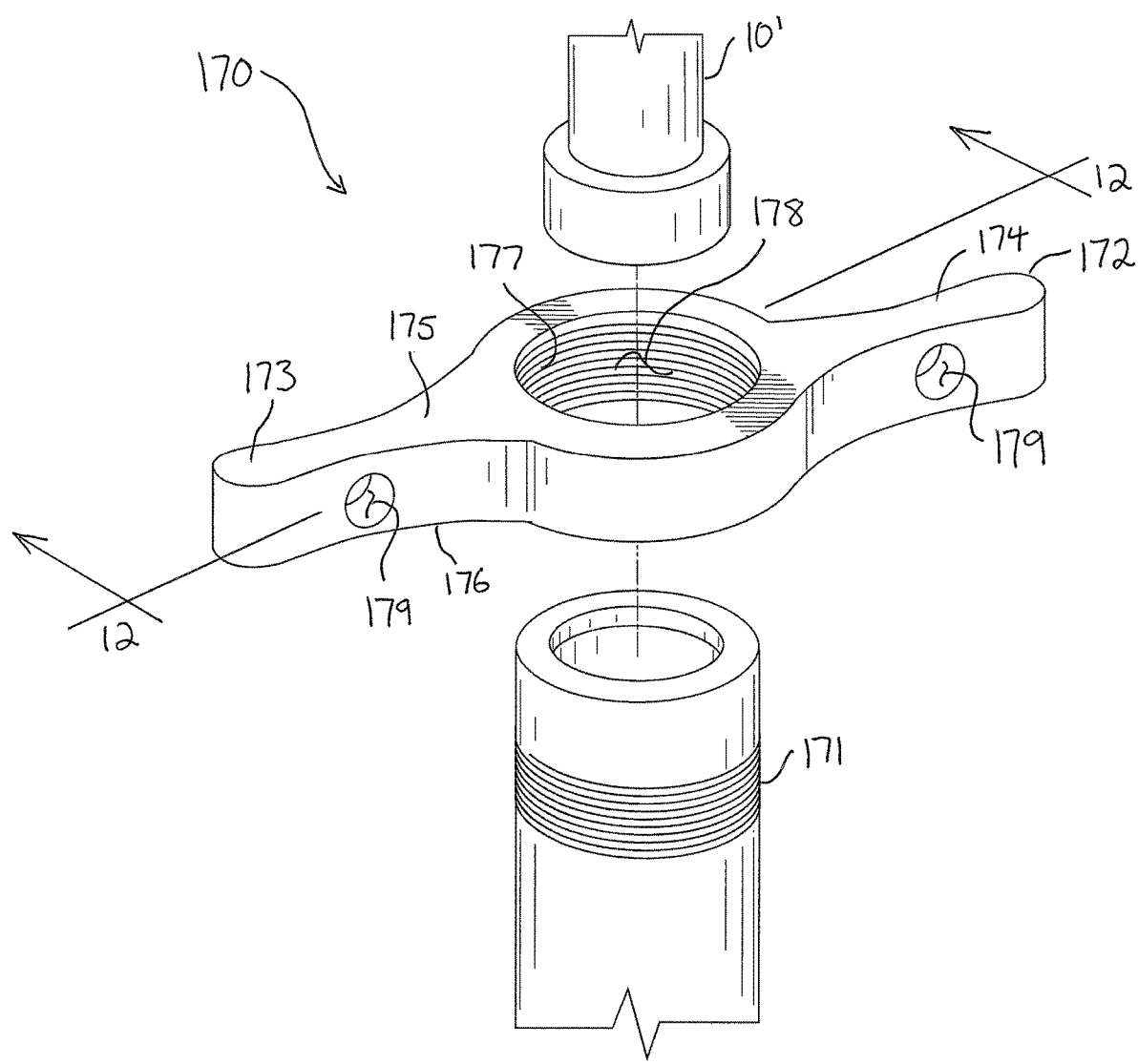
FIG. 11 is an exploded top perspective view of an embodiment of a gas cylinder quick release device.
Figure 12A:
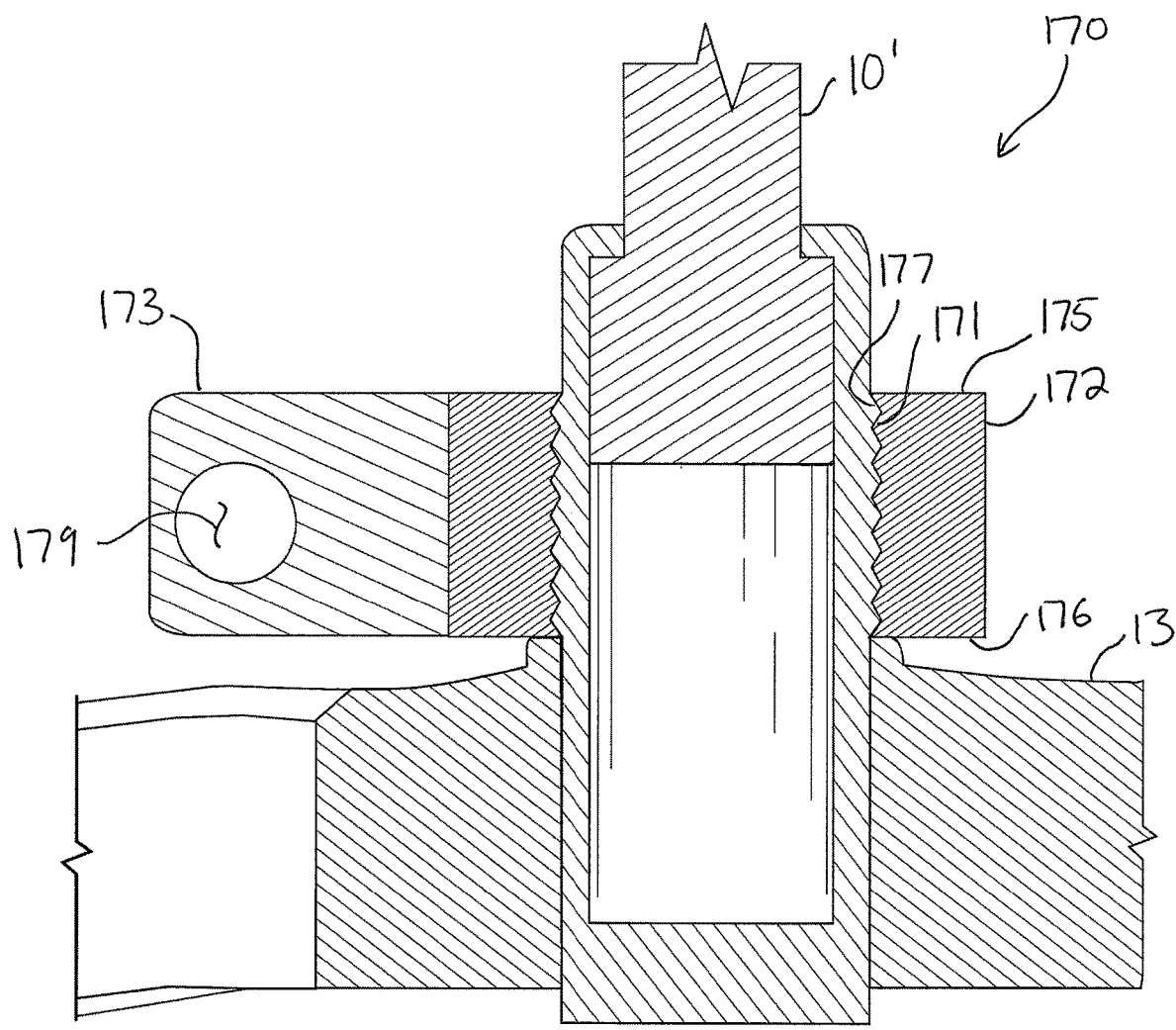
FIGS. 12A and 12B are section views taken along the line 12-12 in FIG. 11 showing the gas cylinder quick release device of FIG. 11 in operative and expanded conditions, applied on a gas cylinder and a wheelbase.
Figure 12B:
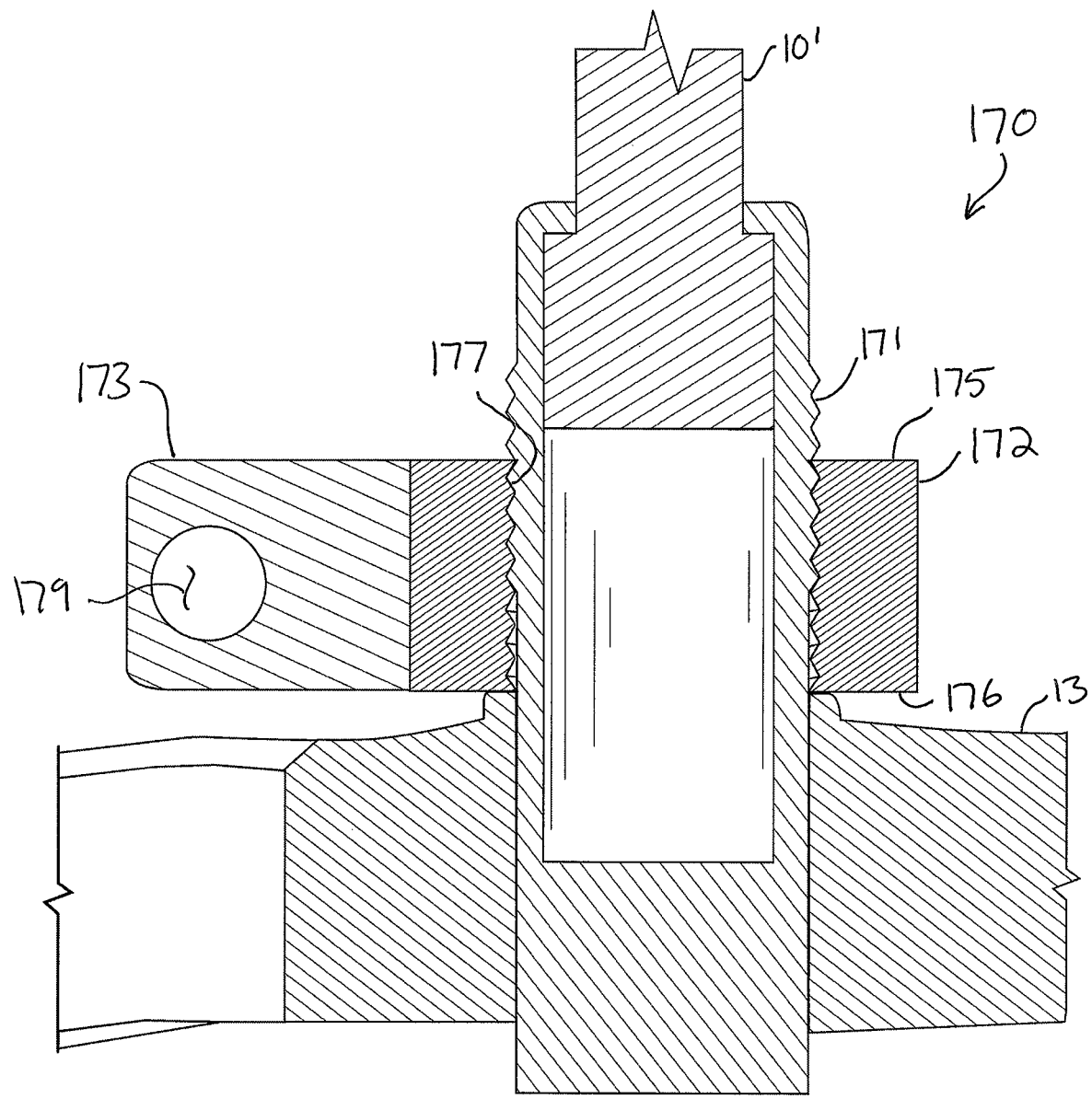

FIGS. 11-12B illustrate an embodiment of a gas cylinder quick release device 170 ("device 170"). The device 170 is very similar to the device 150, but lacks a sleeve 151, the threads instead being formed integrally to the gas cylinder 10'. In the device 170, threads 171 are formed directly and integrally into a portion of sidewall of the gas cylinder 10' proximate to the wheelbase 13.

The wingnut 172 has a hard, durable, and rigid generally cylindrical body with two diametrically-opposed and radially-extending arms 173 and 174. The wingnut 172 further includes a top 175, an opposed bottom 176, and a threaded inner surface 177 bounding and defining a cylindrical inner volume 178. The threads formed on the inner surface 177 correspond in pitch to the threads 171 formed into the gas cylinder 10'. The entire wingnut 172 is incompressible. The arms 173 and 174 are each formed with through-holes 179 near their distal ends; rods or other tools can be placed in the through-holes 179 to increase the lever arm and decrease the necessary force when the wingnut 172 needs to be turned on the threads 171.

During manufacture, the threads 171 are formed into the gas cylinder 10', and the wingnut 172 is applied during manufacture or before assembly by the user. The device 170 is useful in a chair, but may also be used with tables and other furniture or devices in which a fitting or fixture is press-fit onto a gas cylinder or other cylindrical member. One having ordinary skill in the art will also readily appreciate that the device 170 may be used with gas cylinders of different sizes and diameters, and that such interchangeability is easily accommodated by changing the inner diameter or proportions of the device 170, without changing its structural elements, features, and operation.

The wheelbase 13 may be fit onto the gas cylinder 10' by the user. When the device 170 is properly distanced from the bottom of the gas cylinder 10', the wheelbase 13 slips onto the gas cylinder 10' until a top of the wheelbase 13 encounters the bottom 176 of the wingnut 172, as shown in FIG. 11A. This defines the operative condition of the device 170. The chair may then be used normally.

When it is time to disassemble the chair, the device 170 is moved into the expanded condition shown in FIG. 10B. The user merely grasps the arms 173 and 174 and rotates the wingnut on the threads 171. Rotation about the axis imparts downward movement of the wingnut 172 along the axis, into the wheelbase 13. The wingnut 172 can be advanced axially downward quite far, but only needs to move several millimeters. When the wingnut 172 has moved downward these several millimeters, because the wingnut 172 is rigid and incompressible, all force is directed into the wheelbase 13, and the wheelbase 13 also moves down those several millimeters on the gas cylinder 10'. Because the gas cylinder 10' has a slight taper near its bottom, moving the wheelbase 13 a few millimeters downward is a sufficient distance to loosen the tight press-fit between the wheelbase 13 and the gas cylinder 10', and so the wheelbase 13 can now be easily removed by hand.

Figure 13:
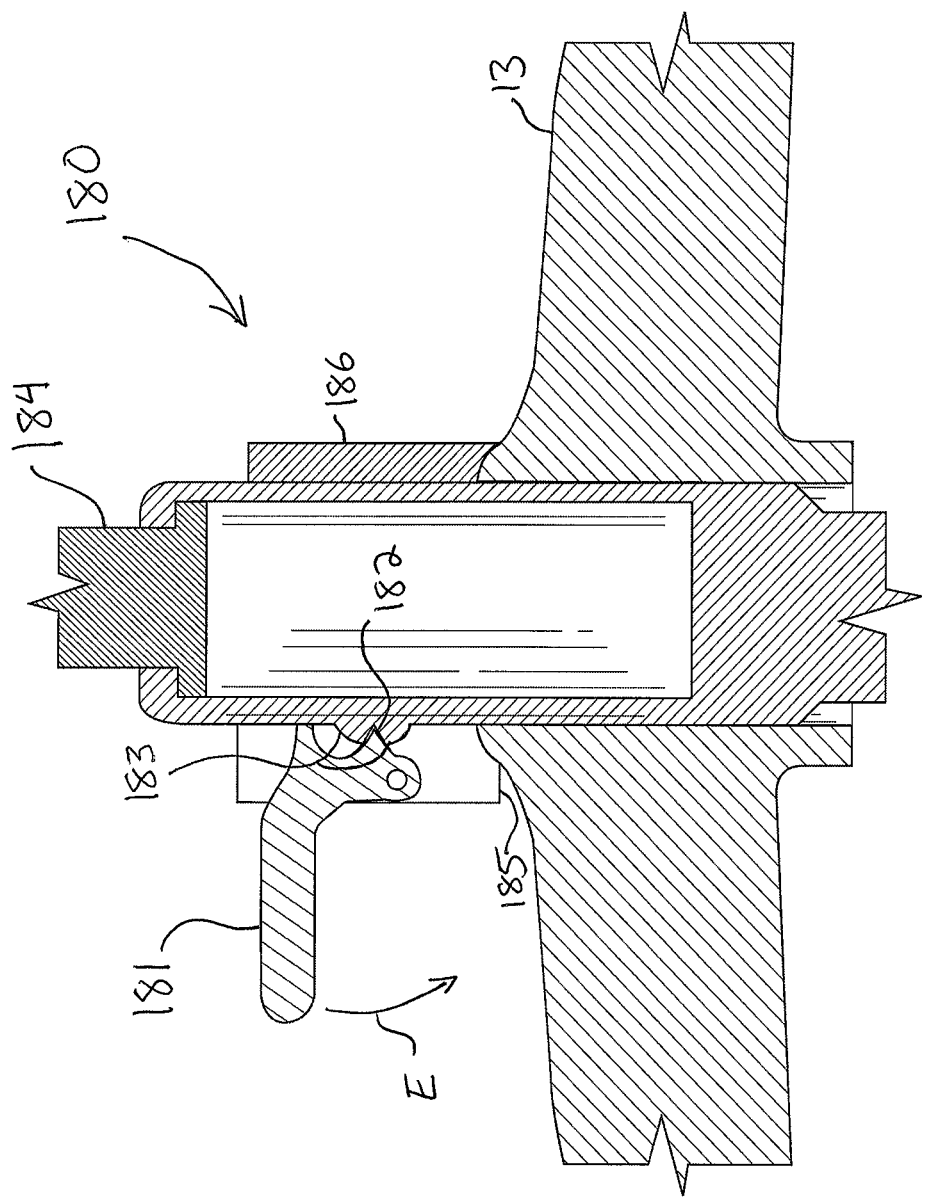
FIG. 13 is a section view of an embodiment of a gas cylinder quick release device.

FIG. 13 illustrates an embodiment of a gas cylinder quick release device 180 ("device 180"). The device 180 is a severed cylindrical sleeve 186 pivoted with a cam arm 181 having a pawl 182, and two teeth 183 formed integrally to and outwardly from the gas cylinder 184. The pawl 182 of the cam arm 181 is disposed between the two teeth 183. The cam arm 181 is moveable between a first position, as shown in FIG. 13, and a second position, in which the cam arm 181 is pivoted down along the arcuate arrowed line E. Moving the cam arm 181 downward causes the pawl 182 to push upward on the teeth 183, thereby causing the device 180 to move downward axially with respect to the gas cylinder 184. The bottom 185 of the device 180 thus pushes the wheelbase 13 downward, breaking the press-fit engagement of the wheelbase 13 on the gas cylinder 184.

Figure 14:
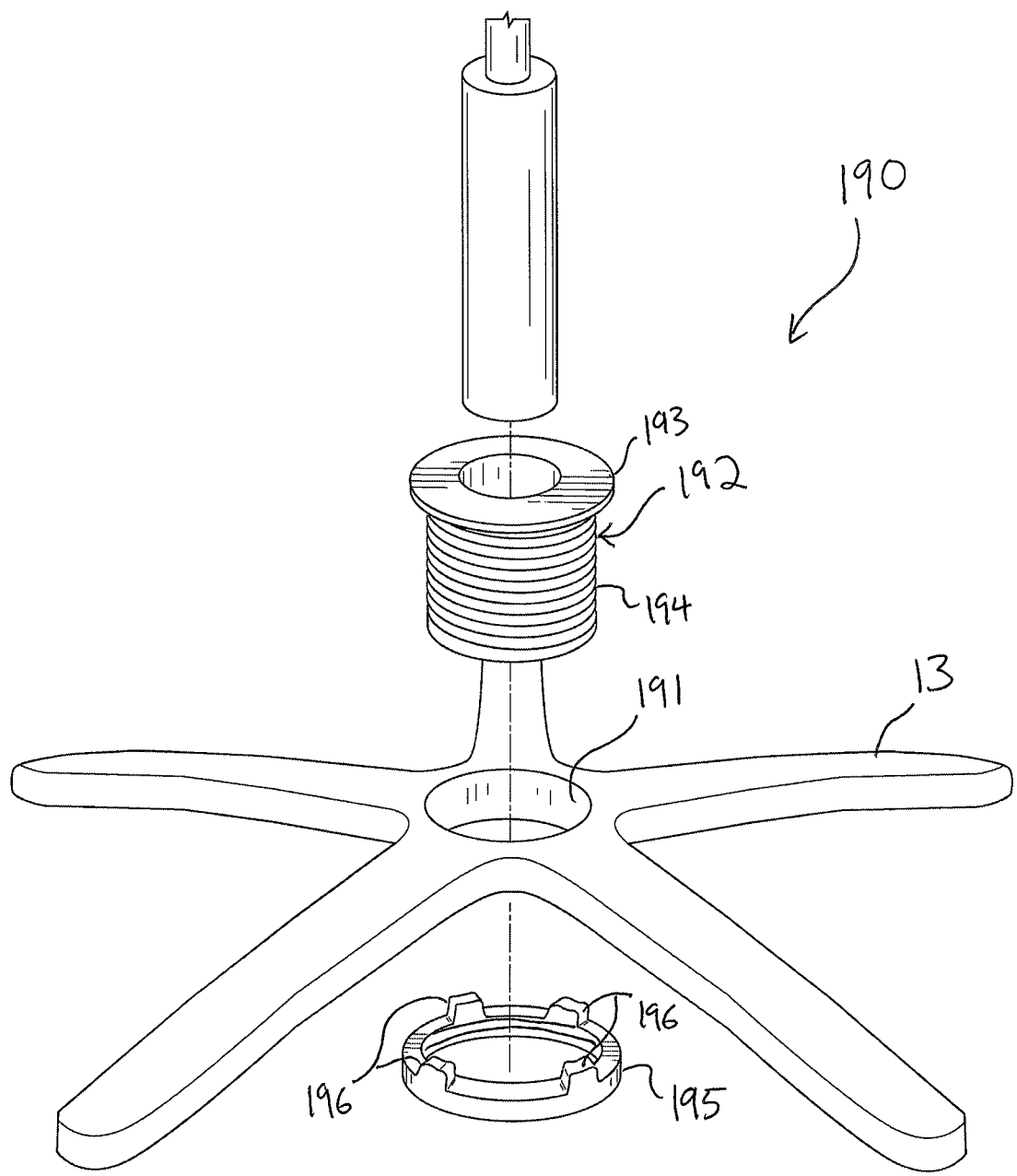
FIG. 14 is an exploded top perspective view of an embodiment of a gas cylinder quick release device.

FIG. 14 illustrates an embodiment of a gas cylinder quick release device 190 ("device 190"). Here, the wheelbase 13 includes a wide, central socket 191. An annular collar 192 is formed with a flanged head 193 and a threaded lower sidewall 194. The outer diameter of the threaded sidewall 194 corresponds to the socket 191 so as to be received therein, and the inner diameter of the threaded sidewall 194 corresponds to the outer diameter of a lower portion of the gas cylinder 10, so as to receive the gas cylinder 10 in a press-fit engagement. The device 190 further includes a lock nut 195. The lock nut 195 includes a threaded inner face and an upper face formed with four protrusions 196 which engage with depressions on the underside of the wheelbase 13.

In operation, the lock nut 195 is applied into the wheelbase 13 from below and is seated into the bottom of the wheelbase 13, with the four protrusions 196 received in the corresponding four depressions in the wheelbase 13. The collar 192 is then applied from above the wheelbase 13 to the socket 191, and is threadably engaged to the lock nut 195 until the collar 192 and the locknut 195 are tightly affixed to each other with the wheelbase 13 disposed therebetween. Once fixed in this manner, the lower portion of the gas cylinder 10 is dropped into the collar 192, and the remainder of the chair is assembled in a conventional manner. The chair can then be used. When the chair must be disassembled, the collar 192 is threadably disengaged from the lock nut 195 until the two are separated, which allows the collar 192, and the gas cylinder 10 now seated into the collar 192, to be removed from the wheelbase 13 easily.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that such modifications do not depart from the spirit of the invention, they are intended to be included within the scope thereof.

The invention claimed is:

1. A device comprising:
an upper bearing plate;
a lower annular collar arranged below the upper bearing plate on an axis common to the upper bearing plate and the lower annular collar; and
a handle which is mounted to move between a first position and a second position, wherein movement of the handle from the first position to the second position imparts axial displacement of the upper bearing plate and the lower annular collar away from each other along the axis;
wherein the lower annular collar moves downward along the axis when the lower annular collar is axially displaced away from the upper bearing plate.

2. The device of claim 1, wherein the upper bearing plate has an annular shape.

3. The device of claim 2, wherein the upper bearing plate is thin.

4. The device of claim 1, wherein the lower annular collar is severed at a gap.

5. The device of claim 4, wherein the handle is mounted to the lower annular collar at the gap.

6. The device of claim 1, wherein the handle is mounted to the lower annular collar.

7. The device of claim 1, wherein the lower annular collar has an inner surface formed with threads.

8. The device of claim 1, wherein the handle includes a nose, directed inward, which bears into the upper bearing plate when the handle is moved from the first position to the second position, thereby axially displacing the upper bearing plate and the lower annular collar from each other.

9. A device comprising:
an upper bearing plate;
a lower annular collar arranged below the upper bearing plate on an axis common to the upper bearing plate and the lower annular collar;
a handle which is mounted to move between a first position and a second position, wherein movement of the handle from the first position to the second position imparts axial displacement of the upper bearing plate and the lower annular collar away from each other along the axis; and
the upper bearing plate and the lower annular collar are bound to each other opposite the handle;
wherein the lower annular collar moves downward along the axis when the lower annular collar is axially displaced away from the upper bearing plate.

10. The device of claim 9, wherein the upper bearing plate has an annular shape.

11. The device of claim 10, wherein the upper bearing plate is thin.

12. The device of claim 9, wherein the lower annular collar is severed at a gap.

13. The device of claim 12, wherein the handle is mounted to the lower annular collar at the gap.

14. The device of claim 9, wherein the handle is mounted to the lower annular collar.

15. The device of claim 9, wherein the lower annular collar has an inner surface formed with threads.

16. The device of claim 9, wherein the handle includes a nose, directed inward, which bears into the upper bearing plate when the handle is moved from the first position to the second position, thereby axially displacing the upper bearing plate and the lower annular collar from each other.

17. A device comprising:
   a bearing plate;
   an annular collar arranged proximate the bearing plate on an axis common to the bearing plate and the annular collar; and
   a handle which is mounted to move between a first position and a second position, wherein movement of the handle from the first position to the second position imparts axial displacement of the bearing plate and the annular collar away from each other along the axis;
   wherein the lower annular collar is severed at a gap, and the handle is mounted to the lower annular collar at the gap; and
   wherein the annular collar moves along the axis when the annular collar is axially displaced away from the bearing plate.

18. The device of claim 17, wherein the lower annular collar has an inner surface formed with threads.

19. The device of claim 17, wherein the handle includes a nose, directed inward, which bears into the upper bearing plate when the handle is moved from the first position to the second position, thereby axially displacing the upper bearing plate and the lower annular collar from each other.

* * * * *